US012647569B2

(12) United States Patent
Chang et al.

(10) Patent No.: US 12,647,569 B2
(45) Date of Patent: Jun. 2, 2026

(54) TEMPLATE MATCHING REFINEMENT IN INTER-PREDICTION MODES

(71) Applicant: QUALCOMM Incorporated, San Diego, CA (US)

(72) Inventors: Yao-Jen Chang, San Diego, CA (US); Han Huang, San Diego, CA (US); Vadim Seregin, San Diego, CA (US); Chun-Chi Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/671,610

(22) Filed: May 22, 2024

(65) Prior Publication Data

US 2024/0397053 A1 Nov. 28, 2024

Related U.S. Application Data

(63) Continuation of application No. 17/655,895, filed on Mar. 22, 2022, now Pat. No. 12,022,085.

(Continued)

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/159* (2014.11); *H04N 19/176* (2014.11); *H04N 19/70* (2014.11)

(58) Field of Classification Search
CPC .. H04N 19/137; H04N 19/105; H04N 19/159; H04N 19/176; H04N 19/70
(Continued)

(56) References Cited

U.S. PATENT DOCUMENTS

2020/0413089 A1* 12/2020 Liao ..................... H04N 19/139
2022/0086433 A1* 3/2022 Zhang ................... H04N 19/70
(Continued)

FOREIGN PATENT DOCUMENTS

JP 2022507281 A 1/2022
JP 2024512647 A 3/2024
(Continued)

OTHER PUBLICATIONS

Abdoli (Ateme) M., et al., "Non-CE3: Decoder-Side Intra Mode Derivation (DIMD) with Prediction Fusion Using Planar", 15. JVET Meeting, Jul. 3, 2019-Jul. 12, 2019, Gothenburg, (The Joint Video Exploration Team of ISO/IEC JTC1/SC29/WG11 and ITU-TSG. 16), No. JVET-O0449-V2, m48570, Jul. 4, 2019, XP030219611, XP030219610, abstract, figures 1-3, paragraphs [0001], [0002], [8.4.2], pp. 1-9.

(Continued)

*Primary Examiner* — Albert Kir
(74) *Attorney, Agent, or Firm* — Shumaker & Sieffert, P.A.

(57) ABSTRACT

A device for decoding video data includes memory configured to store the video data and processing circuitry. The processing circuitry is configured to determine that a current block of the video data is inter-predicted in a combined inter-intra prediction (CIIP) mode or a geometric partitioning mode (GPM), determine that template matching is enabled for the current block, generate a motion vector for the current block based on template matching; determine a prediction block for the current block based on the motion vector in accordance with the CHIP mode or the GPM, and reconstruct the current block based on the prediction block.

12 Claims, 12 Drawing Sheets

Related U.S. Application Data

(60) Provisional application No. 63/176,798, filed on Apr. 19, 2021, provisional application No. 63/173,834, filed on Apr. 12, 2021.

(51) Int. Cl.
*H04N 19/159* (2014.01)
*H04N 19/176* (2014.01)
*H04N 19/70* (2014.01)

(58) Field of Classification Search
USPC ..................................................... 375/240.02
See application file for complete search history.

(56) References Cited

U.S. PATENT DOCUMENTS

| | | | | |
|---|---|---|---|---|
| 2022/0086441 A1* | 3/2022 | Zhang | .................. | H04N 19/159 |
| 2022/0103834 A1* | 3/2022 | Zhang | .................... | H04N 19/70 |
| 2022/0239899 A1 | 7/2022 | Zhang et al. | | |
| 2022/0295088 A1* | 9/2022 | Zhang | .................... | H04N 19/52 |
| 2022/0295089 A1 | 9/2022 | Zhang et al. | | |
| 2022/0295090 A1 | 9/2022 | Zhang et al. | | |
| 2022/0311997 A1 | 9/2022 | Huang et al. | | |
| 2022/0329822 A1 | 10/2022 | Chang et al. | | |
| 2022/0329823 A1 | 10/2022 | Chen et al. | | |
| 2022/0329824 A1 | 10/2022 | Liao et al. | | |
| 2023/0108504 A1 | 4/2023 | Li et al. | | |
| 2023/0115768 A1 | 4/2023 | Liao et al. | | |
| 2023/0156218 A1 | 5/2023 | Zhao et al. | | |
| 2024/0364874 A1* | 10/2024 | Heo | .................... | H04N 19/176 |
| 2024/0397053 A1* | 11/2024 | Chang | .................. | H04N 19/154 |
| 2025/0080769 A1* | 3/2025 | Chen | .................... | H04N 19/176 |

FOREIGN PATENT DOCUMENTS

| | | | |
|---|---|---|---|
| WO | 2020103852 A1 | 5/2020 |
| WO | 2020222588 A1 | 11/2020 |
| WO | 2021025451 A1 | 2/2021 |
| WO | 2022217159 A1 | 10/2022 |

OTHER PUBLICATIONS

Bross B., et al., "Versatile Video Coding (Draft 10)", Joint Video Experts Team (JVET) of ITU-T SG 16 WP 3 and ISO/IEC JTC 1/SC 29/WG 11, 131, MPEG Meeting, 19th Meeting, by Teleconference, Jun. 22-Jul. 1, 2020, Jun. 29, 2020-Jul. 3, 2020, Online, (Motion Picture Expert Group or ISO/IEC JTC1/SC29/WG11), No. JVET-S2001-vH, Version 17, Sep. 4, 2020, XP030293002, 548 Pages.

Chang Y-J., et al., "Compression Efficiency Methods Beyond VVC", JVET-U0100, Joint Video Experts Team (JVET) of ITU-T SG 16 WP 3 and ISO/IEC JTC 1/SC 29, 21st Meeting, by Teleconference, Jan. 6-15, 2021, XP030293237, Dec. 31, 2020, pp. 1-13, sections 3.2 and 3.3, abstract, Section 5.

Chen C-C., et al., "EE2-related: Extension of Template Matching to Affine, CIIP, GPM Merge Modes, and Boundary Sub-Blocks", JVET-V0118-v2, Joint Video Experts Team (JVET) of ITU-T SG 16 WP 3 and ISO/IEC JTC 1/SC 29, 22nd Meeting, by teleconference, Apr. 20-28, 2021, pp. 1-3.

Chen C-C (Qualcomm) et al., "EE2-Related: Extension of Template Matching to Affine, CIIP, GPM Merge Modes, and Boundary Sub-Blocks", 22. JVET Meeting, Apr. 20, 2021-Apr. 28, 2021, Teleconference, (The Joint Video Exploration Team of ISO/IEC JTC1/SC29/WG11 and ITU-T SG.16), No. JVET-V0118, m56532, Apr. 14, 2021 (Apr. 14, 2021), pp. 1-3, XP030294297, URL: https://jvet-experts.org/doc_end_user/documents/22_Teleconference/wg11/JVET-V0118-v1.zip JVET-V0118-v1.docx.

Chen J., et al., "Algorithm Description for Versatile Video Coding and Test Model 11 (VTM 11)", JVET-T2002-v2, Joint Video Experts Team (JVET) of ITU-T SG 16 WP 3 and ISO/IEC JTC 1/SC 29, 20th Meeting, by teleconference, Oct. 7-16, 2020, pp. 1-101.

Chen J., et al., "Algorithm Description for Versatile Video Coding and Test Model 9 (VTM 9)", 130. MPEG Meeting, Apr. 29, 2020-Apr. 24, 2020, Alpbach, (Motion Picture Expert Group or ISO/IEC JTC1/SC29/WG11), No. m53984, 18th JVET Meeting, JVET of ITU-T SG 16 WP 3 and ISO/IEC JTC 1/SC 29/WG 11, Apr. 15-24, 2020, JVET-R2002-v2, Jun. 15, 2020 (Jun. 15, 2020), XP030289596, 97 Pages, pp. 80. 81, paragraph 3.7.3.1, Section 3.7.1.

Chen Y-W., et al., "Description of SDR, HDR and 360° Video Coding Technology Proposal by Qualcomm and Technicolor—Low and High Complexity Versions", Joint Video Exploration Team (JVET) of ITU-T SG 16 WP 3 and ISO/IEC JTC 1/SC 29/WG 11, JVET-J0021, 10th Meeting, San Diego, US, Apr. 10, 2018-Apr. 20, 2018, No. JVET-J0021, Apr. 14, 2018, pp. 1-44, XP030248214, Paragraph [2.8.1], Figure 10.

Coban M., et al., "Algorithm Description of Enhanced Compression Model 2 (ECM 2)", 23rd, MPEG Meeting, Jul. 7, 2021-Jul. 16, 2021, Online, (Motion Picture Expert Group or ISO/IEC JTC1/SC29/WG11), No. M57745, JVET-W2025, Sep. 1, 2021, XP030297803, pp. 1-22, section [3.2.4 Multi-pass decoder-side motion vector refinement] section [3.2.8 Multi-hypothesis prediction (MHP)] sections 3.2.1 and 3.2.3.

Deng Z., et al., "EE2-3.1-related: CIIP with Template Matching", JVET-X0141-v4, Joint Video Experts Team (JVET) of ITU-T SG 16 WP 3 and ISO/IEC JTC 1/SC 29, 24th Meeting, by Teleconference, Oct. 6-15, 2021, pp. 1-3.

Han Y., et al., "CE4.4.6: Improvement on Merge/Skip Mode," JVET-L0399_r2, Joint Video Exploration Team (JVET) of ITU-T SG 16 WP 3 and ISO/IEC JTC 1/SC 29/WVG 11, JVET-L0399, 12th Meeting: Macao, CN, Oct. 3-12, 2018, pp. 1-6.

Henry F., et al., "Residual Coefficient Sign Prediction", 4th JVET Meeting, Oct. 15, 2016-Oct. 21, 2016, Chengdu, (The Joint Video Exploration Team of ITU-T SG 16 WP 3 and ISO/IEC JTC 1/SC 29/WG 11), No. JVET-D0031, Oct. 20, 2016, JVET-D0031-v2, JVET-D0031-v4, XP030150258, pp. 1-6, section 2. 2, section 2. 3, section 2. 4, section 2.4.

International Preliminary Report on Patentability—PCT/US2022/021551—The International Bureau of WIPO—Geneva, Switzerland—Oct. 26, 2023.

International Search Report and Written Opinion—PCT/US2022/021551—ISA/EPO—Jun. 29, 2022.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Karczewicz M., et al., "Common Test Conditions and Evaluation Procedures for Enhanced Compression Tool Testing", JVET-V2017-v1, Joint Video Experts Team (JVET) of ITU-T SG 16 WP 3 and ISO/IEC JTC 1/SC 29, 22nd Meeting, by teleconference, Apr. 20-28, 2021, pp. 1-7.

Li X., et al., "EE2-3.1: Combination of CIIP and DIMD/TIMD", JVET-X0098-v1, Joint Video Experts Team (JVET) of ITU-T SG 16 WP 3 and ISO/IEC JTC 1/SC 29, 24th Meeting, by teleconference, Oct. 6-15, 2021, pp. 1-4.

Liao R-L (Alibaba-Inc) et al., "EE2-Related: Combination of GPM and Template Matching", 22. JVET Meeting, Apr. 20, 2021-Apr. 28, 2021, Teleconference, (The Joint Video Exploration Team of ISO/IEC JTC1/SC29/WG11 and ITU-T SG.16), No. JVET-V0117, m56531, Apr. 14, 2021 (Apr. 14, 2021), XP030294294, pp. 1-2, URL: https://jvet-experts.org/doc_end_user/documents/22_Teleconference/wg11/JVET-V0117-v1.zip JVET-V0117.docx.

Liao R-L., et al., "EE2: Results of Test 3.4 and Test 3.5", JVET-W0065, Joint Video Experts Team (JVET) of ITU-T SG 16 WP 3 and ISO/IEC JTC 1/SC 29, 23rd Meeting, by teleconference, Jul. 7-16, 2021, pp. 1-5.

Liao R.L., et al., "EE2-Related: Combination of GPM and Template Matching", JVET-V0117-v2, Joint Video Experts Team (JVET) of ITU-T SG 16 WP 3 and ISO/IEC JTC 1/SC 29, 22nd Meeting, by Teleconference, Apr. 20-28, 2021, pp. 1-2.

(56) References Cited

OTHER PUBLICATIONS

Lin Z-Y., et al., "CE10.2.1: OBMC", JVET-L0101-v1, Joint Video Experts Team (JVET) of ITU-T SG 16 WP 3 and ISO/IEC JTC 1/SC 29/WG 11, 12th Meeting: Macao, CN, Oct. 3-12, 2018, pp. 1-7, No. m44107, Oct. 1, 2018, XP030191474.

Ray B (QUALCOMM)., et al., "Unified PDPC for Angular Intra Modes", JVET-Q0391-v3, Joint Video Experts Team (JVET) of ITU-T SG 16 WP 3 and ISO/IEC JTC 1/SC 29/WG 11, 17th Meeting, Brussels, BE, Jan. 7-17, 2020, Jan. 8, 2020 (Jan. 8, 2020), m51986, XP030223398, pp. 1-7, Sections 1, 2, 4, p. 1-p. 3, Figures 1-3.

Schwarz H., et al., "Additional Support of Dependent Quantization with 8 States", JVET-Q0243, Jan. 2020, 11 pages.

Seregin V., et al., "Block Shape Dependent Intra Mode Coding", 4th JVET Meeting, Chengdu, (The Joint Video Exploration Team of ISO/IEC JTC1/SC29/WG11 and ITU-T SG. 16 WP 3), JVET-D0114r1, URL: http://phenix.int-evry.fr/jvet/, CN, Oct. 15-21, 2016, 3 pages.

Seregin V., et al., "CE4-3.1a and CE4-3.1b: Unidirectional Local Illumination Compensation with Affine Prediction", JVET-O0066-v1, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-5.

Seregin V., et al., "Exploration Experiment on Enhanced Compression Beyond VVC Capability (EE2)", JVET-W2024-v4, Joint Video Experts Team (JVET) of ITU-T SG 16 WP 3 and ISO/IEC JTC 1/SC 29, 23rd Meeting, by Teleconference, Jul. 7-16, 2021, pp. 1-11.

Strom J., et al., "CE1-related: Multiplication-free Bilateral Loop Filter", JVET-N0493_v2, Joint Video Experts Team (JVET) of ITU-T SG 16 WP 3 and ISO/IEC JTC 1/SC 29/WG 11, 14th Meeting: Geneva, CH, Mar. 19-27, 2019, pp. 1-8.

Strom J., et al., "CE5-3.1 Combination of Bilateral Filter and SAO", JVET-P0073_v3, Joint Video Experts Team (JVET) of ITU-T SG 16 WP 3 and ISO/IEC JTC 1/SC 29/WG 11, 16th Meeting: Geneva, CH, Oct. 1-11, 2019, pp. 1-18.

Winken M., et al., "CE10: Multi-Hypothesis Inter Prediction (Test 10.1.2)", JVET-M0425-v2, Joint Video Experts Team (JVET) of ITU-T SG 16 WP 3 and ISO/IEC JTC 1/SC 29/WG 11, 13th Meeting: Marrakech, MA, Jan. 9-18, 2019, XP030200865, pp. 1-14, Sections 1, 2.2.

Zhang K., et al., "Enhanced Cross-Component Linear Model Intra-Prediction", JVET-D0110, Joint Video Exploration Team (JVET) of ITU-T SG 16 WP 3 and ISO/IEC JTC 1/SC 29/WG 11, 4th Meeting: Chengdu, CN, Oct. 15-21, 2016, JVET-D0110-v3, pp. 1-6.

Zhao L., et al., "Non-CE: Weighted Intra and Inter Prediction Mode", Joint Video Experts Team (JVET) of ITU-T SG 16 WP 3 and ISO/IEC JTC 1/SC 29/WG 11, JVET-O0537, 15th Meeting: Gothenburg, SE, Jul. 3-12, 2019, Doc: JVET-O0537, pp. 1-6.

Zhao X., et al., "Six Tap Intra Interpolation Filter", JVET-D0119, Oct. 2016, 6 pages.

Taiwan Search Report—TW111110918—TIPO—May 15, 2025 (1 pp).

* cited by examiner

350

PREDICT CURRENT BLOCK

352

CALCULATE RESIDUAL BLOCK
FOR CURRENT BLOCK

354

TRANSFORM AND QUANTIZE
RESIDUAL BLOCK

356

SCAN TRANSFORM
COEFFICIENTS OF RESIDUAL
BLOCK

358

ENTROPY ENCODE
TRANSFORM COEFFICIENTS

360

OUTPUT ENTROPY ENCODED
DATA OF BLOCK

| Merge Index | L0 MV | L1 MV |
|:---:|:---:|:---:|
| 0 | X | |
| 1 | | X |
| 2 | X | X |
| 3 | | X |
| 4 | X | |

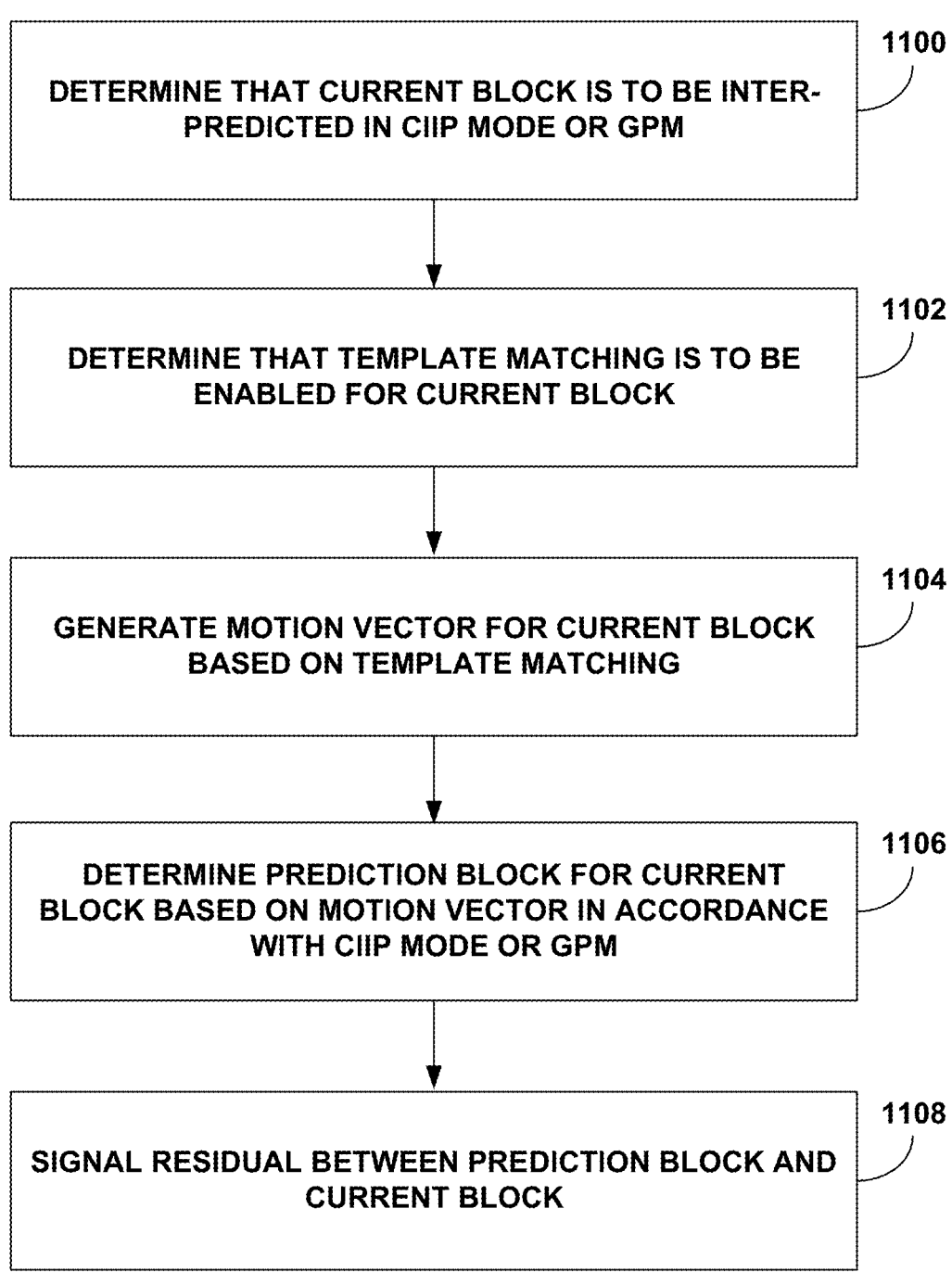

DETERMINE THAT CURRENT BLOCK IS TO BE INTER-PREDICTED IN CIIP MODE OR GPM — 1100

DETERMINE THAT TEMPLATE MATCHING IS TO BE ENABLED FOR CURRENT BLOCK — 1102

GENERATE MOTION VECTOR FOR CURRENT BLOCK BASED ON TEMPLATE MATCHING — 1104

DETERMINE PREDICTION BLOCK FOR CURRENT BLOCK BASED ON MOTION VECTOR IN ACCORDANCE WITH CIIP MODE OR GPM — 1106

SIGNAL RESIDUAL BETWEEN PREDICTION BLOCK AND CURRENT BLOCK — 1108

FIG. 11

DETERMINE THAT CURRENT BLOCK IS INTER-PREDICTED IN CIIP MODE OR GPM    1200

DETERMINE THAT TEMPLATE MATCHING IS ENABLED FOR CURRENT BLOCK    1202

GENERATE MOTION VECTOR FOR CURRENT BLOCK BASED ON TEMPLATE MATCHING    1204

DETERMINE PREDICTION BLOCK FOR CURRENT BLOCK BASED ON MOTION VECTOR IN ACCORDANCE WITH CIIP MODE OR GPM    1206

RECONSTRUCT CURRENT BLOCK BASED ON PREDICTION BLOCK    1208

TEMPLATE MATCHING REFINEMENT IN INTER-PREDICTION MODES

This application is a continuation of U.S. application Ser. No. 17/655,895, filed Mar. 22, 2022, which claims the benefit of U.S. Provisional Patent Application 63/173,834, filed Apr. 12, 2021 and U.S. Provisional Patent Application 63/176,798, filed Apr. 19, 2021, the entire content of each is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for utilizing template matching (TM) refinement in inter-prediction modes such as combined inter/intra prediction (CIIP), geometric partitioning mode (GPM), or multi-hypothesis prediction (MHP). In this manner, the video coding gains associated with TM refined can be extended to inter-prediction modes such as CIIP, GPM, and MHP, as a few examples, providing for a practical application that improves the operation of video coding technologies.

In one example, the disclosure describes a method of decoding video data, the method comprising: determining that a current block is inter-predicted in a combined inter-intra prediction (CIIP) mode or a geometric partitioning mode (GPM); determining that template matching is enabled for the current block; generating a motion vector for the current block based on template matching; determining a prediction block for the current block based on the motion vector in accordance with the CIIP mode or the GPM; and reconstructing the current block based on the prediction block.

In one example, the disclosure describes a device for decoding video data, the device comprising: memory configured to store the video data; and processing circuitry configured to: determine that a current block of the video data is inter-predicted in a combined inter-intra prediction (CIIP) mode or a geometric partitioning mode (GPM); determine that template matching is enabled for the current block; generate a motion vector for the current block based on template matching; determine a prediction block for the current block based on the motion vector in accordance with the CIIP mode or the GPM; and reconstruct the current block based on the prediction block.

In one example, the disclosure describes a computer-readable storage storing instructions thereon that when executed cause one or more processors to: determine that a current block is inter-predicted in a combined inter-intra prediction (CIIP) mode or a geometric partitioning mode (GPM); determine that template matching is enabled for the current block; generate a motion vector for the current block based on template matching; determine a prediction block for the current block based on the motion vector in accordance with the CIIP mode or the GPM; and reconstruct the current block based on the prediction block.

In one example, the disclosure describes a method of encoding video data, the method comprising: determining that a current block is to be inter-predicted in a combined inter-intra prediction (CIIP) mode or a geometric partitioning mode (GPM); determining that template matching is to be enabled for the current block; generating a motion vector for the current block based on template matching; determining a prediction block for the current block based on the motion vector in accordance with CIIP mode or GPM; and signaling information indicative of a residual between the prediction block and the current block.

In one example, the disclosure describes a device for encoding video data, the device comprising: memory configured to store the video data; and processing circuitry configured to: determine that a current block is to be inter-predicted in a combined inter-intra prediction (CIIP) mode or a geometric partitioning mode (GPM); determine that template matching is to be enabled for the current block; generate a motion vector for the current block based on template matching; determine a prediction block for the current block based on the motion vector in accordance with CIIP mode or GPM; and signal information indicative of a residual between the prediction block and the current block.

The details of one or more examples are set forth in the accompanying drawings and the description below. Other features, objects, and advantages will be apparent from the description, drawings, and claims.

BRIEF DESCRIPTION OF DRAWINGS

FIG. 11 is a flowchart illustrating an example of encoding video data.

DETAILED DESCRIPTION

Figure 1:
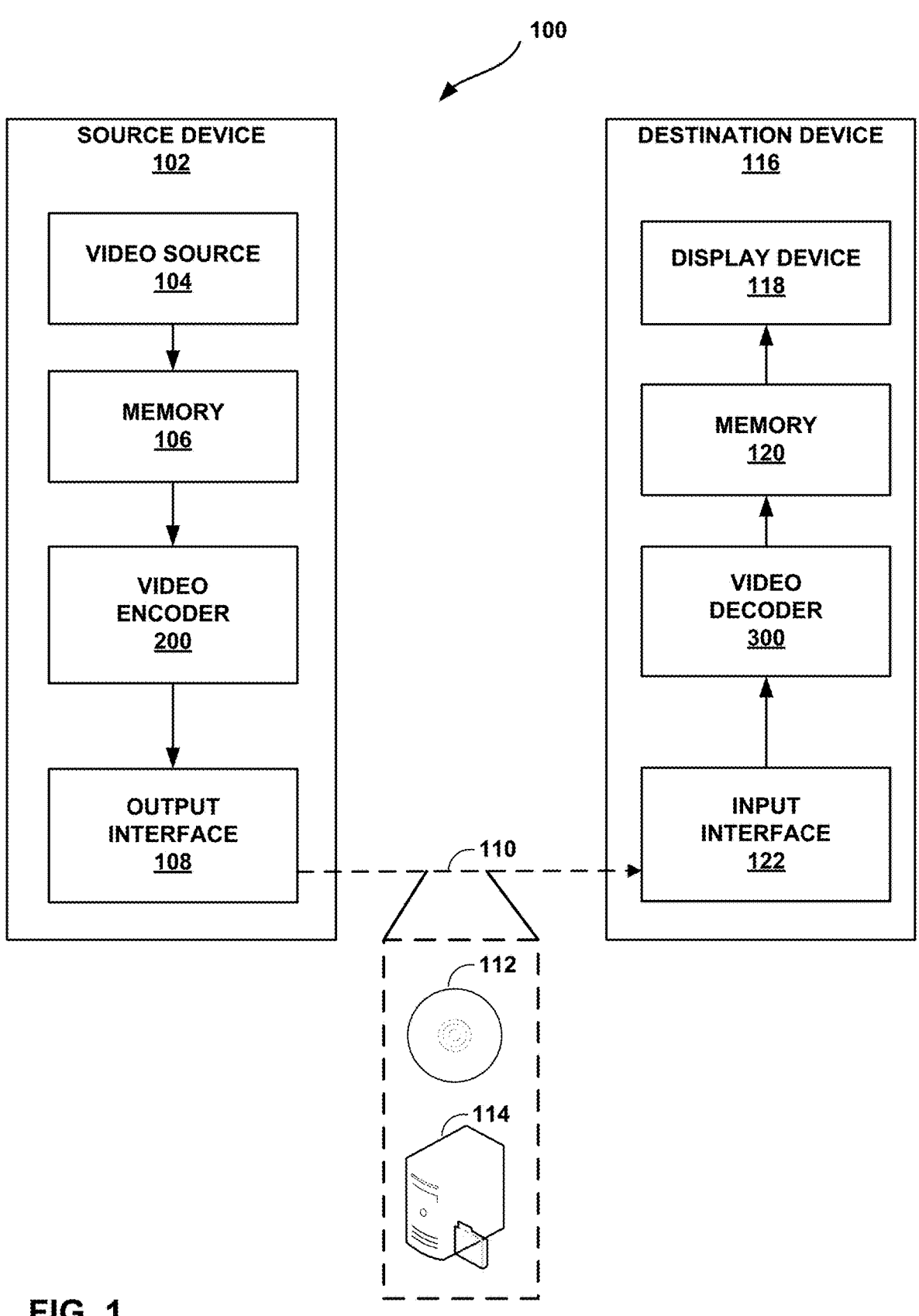
FIG. 1 is a block diagram illustrating an example video encoding and decoding system that may perform the techniques of this disclosure.

As described in more detail, template matching (TM) refinement is a technique that a video decoder utilizes to refine a motion vector for a current block by finding a closest match within a template. For example, the video decoder may determine an initial motion vector for the current block. The initial motion vector may define a search area, also called search range, within a reference picture. The search area may be a rectangular area around a sample in the reference picture pointed to by the initial motion vector. The video decoder may compare reference templates (e.g., templates in the reference picture) within the search area to current templates (e.g., templates in the current picture that includes the current block) to determine reference templates that substantially match the current templates (e.g., have the least difference in sample values with the current templates). The video decoder may determine a motion vector for the current block based on the determined reference templates. For instance, the motion vector may point to the determined reference templates in the reference picture.

In some techniques, TM refinement is not available for certain inter-prediction modes, such as combined inter/intra prediction (CIIP), geometric partitioning mode (GPM), or multi-hypothesis prediction (MHP). Accordingly, for such inter-prediction modes, the video coding gains of TM may not be available.

This disclosure describes example techniques to enable TM refinement for inter-prediction modes such as CIIP, GPM, and MHP. In this way, video coding gains with TM refinement may be available for CIIP, GPM, and MHP. Although the examples are described with respect to CIIP, GPM, and MHP, the example techniques may be applicable to one or more, but not all of, CIIP, GPM, and MHP. Also, CIIP, GPM, and MHP are non-limiting examples of inter-prediction modes.

For example, a video decoder may determine that a current block is inter-predicted in a CIIP mode or a GPM, such as based on information signaled in a bitstream indicating the inter-prediction mode of the current block. The video decoder may also determine that template matching is enabled for the current block, such as based on a coding unit (CU) level syntax element (e.g., flag) that indicates template matching is enabled for the current block.

In such examples, the video decoder may generate a motion vector for the current block based on template matching. For instance, for CIIP mode, the video decoder may generate the motion vector using template matching to determine an inter-predictor (e.g., a block in a picture different than the picture that includes the current block). The video decoder may also determine an intra-predictor based on samples in the same picture as the current block. The video decoder may combine the inter-predictor and the intra-predictor to generate a prediction block for the current block.

As another example, for GPM, the video decoder may partition the current block into a first partition and a second partition. The video decoder may generate a first motion vector for the first partition using template matching, and generate a second motion vector for the second partition using template matching. The video decoder may determine a first prediction partition based on the first motion vector, and determine a second prediction partition based on the second motion vector. The video decoder may combine the first prediction partition and the second prediction partition to determine the prediction block.

The video decoder may reconstruct the current block based on the prediction block. For instance, the video decoder may receive information indicative of a residual (e.g., difference in sample values such as luma and chroma values) between the current block and the prediction block, and sum the residual and the prediction block to reconstruct the current block.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for extension of template matching to CIIP, GPM, and MHP inter-prediction modes. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for extension of template matching to CIIP, GPM, and MHP inter-prediction modes. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder

300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use template matching.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

As described above, Versatile Video Coding (VVC), J. Chen, Y. Ye, and S.-H. Kim, "Algorithm description for Versatile Video Coding and Test Model 9 (VTM 9)," JVET-R2002, April 2020, a latest video coding standard, was developed by Joint Video Experts Team (JVET) of ITU-T and ISO/IEC to achieve substantial compression capability beyond HEVC for a broad range of applications. VVC specification has been finalized in July 2020 and published by both ITU-T and ISO/IEC.

The VVC specification specifies normative bitstream and picture formats, high level syntax (HLS) and coding unit level syntax, and the parsing and decoding process. VVC also specifies profiles/tiers/levels (PTL) restrictions, byte stream format, hypothetical reference decoder and supplemental enhancement information (SEI) in the annex. The techniques described in this disclosure can be applied to further improve state of the art video codecs such as VVC or AV1.

The following describes template matching (TM) prediction. Template matching (TM) is a decoder-side motion vector (MV) derivation method to refine the motion information of the current CU by finding the closest match between a template (i.e., top and/or left neighboring blocks of the current CU) in the current picture and a block (i.e., same size to the template) in a reference picture.

Figure 6:
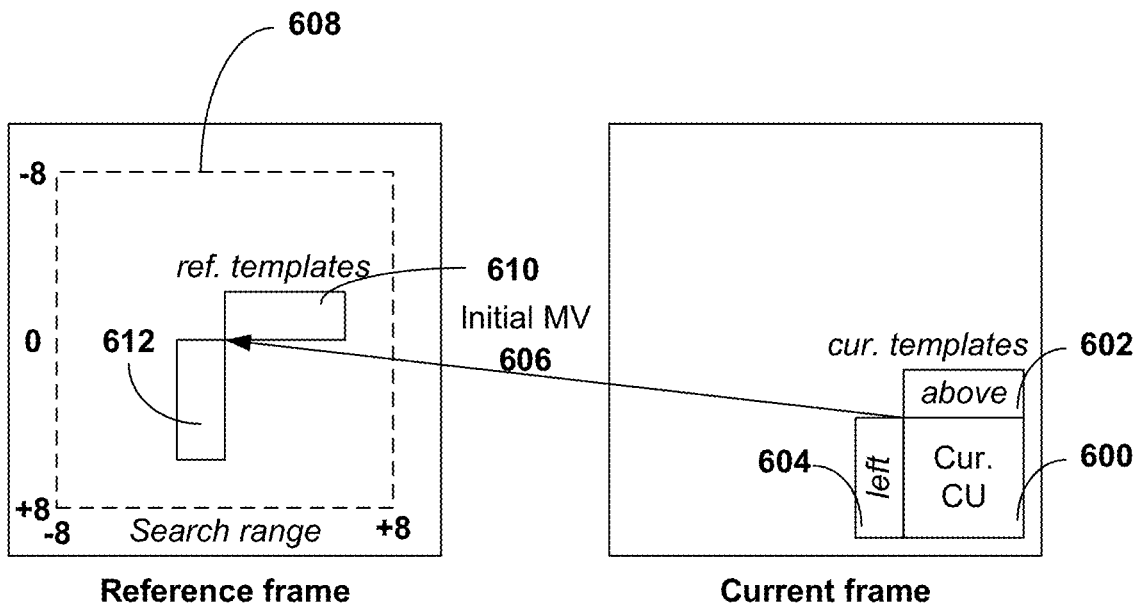
FIG. 6 is a conceptual diagram illustrating an example of template matching performed on a search area around an initial motion vector (MV).

As illustrated in FIG. 6, a better MV is to be searched (e.g., by video decoder 300) around the initial motion of the current CU within a [−8, +8]-pel search range (e.g., search area). With an AMVP candidate selected based on initial matching error, the MVP (motion vector predictor) for the AMVP candidate is refined by template matching. With a merge candidate indicated by signaled merge index, the merged MVs of the merge candidate corresponding to L0 (reference picture list 0) and L1 (reference picture list 1) are refined independently by template matching and then the less accurate one is further refined again with the better one as a prior. Reference picture list 0 and reference picture list 1 refer to the reference picture lists constructed by video encoder 200 and video decoder 300 to identify the reference picture used for inter-prediction.

The following describes cost function in template matching. When a motion vector points to a fractional sample position, motion compensated interpolation is used. To reduce complexity, bi-linear interpolation instead of regular 8-tap DCT-IF interpolation is used for both template matching to generate templates on reference pictures. The matching cost C of template matching is calculated as follows:

$$C = SAD + w * (|MV_x - MV^s x| + |MV_y - MV^s y|).$$

In the above equation, w is a weighting factor which can be set to an integer number such as 0, 1, 2, 3 or 4, and MV and $MV^s$ indicate the currently testing MV and the initial MV (e.g., a MVP candidate in AMVP mode or merged motion in merge mode), respectively. SAD is used as the matching cost of template matching.

When TM is used, motion is refined by using luma samples only. The derived motion will be used for both luma and chroma for MC (motion compensation) inter prediction. After MV is decided, final MC is performed using 8-taps interpolation filter for luma and 4-taps interpolation filter for chroma.

The following describes the search method in template matching. MV refinement is a pattern-based MV search with the criterion of template matching cost and a hierarchical structure. Two search patterns are supported-a diamond search and a cross search for MV refinement. The hierarchical structure specifies an iterative process to refine MV, starting at a coarse MVD precision (e.g., quarter-pel) and ending at a fine one (e.g., ⅛-pel). The MV is directly searched at quarter luma sample MVD precision with the diamond pattern, followed by quarter luma sample MVD precision with cross pattern, and then followed by one-eighth luma sample MVD refinement with cross pattern. The search range (e.g., search area) of MV refinement is set equal to (−8, +8) luma samples around the initial MV. When the current block is of bi-prediction (e.g., bi-predicted), both MVs are refined independently, and then the best of which (in terms of matching cost) is set as a prior to further refine the other MV with BCW weight values.

Specifically, the template matching proposed in JVET-J0021 and JVET-U0100 is applied to AMVP mode and merge mode in the proposals. JVET-J0021 refers to Chen, et al. "Description of SDR, HDR and 360° video coding technology proposal by Qualcomm and Technicolor-low and high complexity versions," Joint Video Exploration Team (JVET) of ITU-T SG 16 WP 3 and ISO/IEC JCT 1/SC 29/WG 11, 10th Meeting: San Diego, 10-20 Apr. 2018, JVET-J0021. JVET-U0100 refers to Chang, et al. "Compression efficiency methods beyond VVC," Joint Video Experts Team (JVET) of ITU-T SG 16 WP 3 and ISO/IEC JCT 1/SC 29/WG 11, 21st Meeting, by teleconference, 6-15 Jan. 2021, JVET-U0100.

The regular merge candidate list is constructed in the order of the following candidates:

a. Spatial MVPs from spatial neighbor CUs: first 4 available candidates are selected among the order of Above neighbor CU (A), Left neighbor CU (L), Above-Right neighbor CU (AR), Left-Below neighbor CU (LB), Left-Above neighbor CU (LA).

b. Temporal MVP from collocated CUs: Only one candidate is added.

c. History-based MVP: The motion information of a previously coded block is stored in a table and used as MVP for the current CU.

d. Pairwise average MVP: Pairwise average candidates are generated by averaging predefined pairs of candidates in the existing regular merge candidate list e. Zero MVs.

When TM is applied to merge mode, a separate TM merge candidate list is constructed by refining the MVPs of the regular merge candidates based on the template matching.

Accordingly, in one or more examples, for TM matching, video decoder 300 may determine an initial motion vector 606 for a current block 600 based on motion information in a merge candidate list (e.g., a TM merge candidate list based on template matching being enabled for the current block). Video decoder 300 may determine a search area 608 in a reference picture based on the initial motion vector 606 (e.g., a rectangular area that is [−8,8]-pel in length and width, as illustrated).

Video decoder 300 may determine reference templates within search area 608. As one example, FIG. 6 illustrates reference templates 610 and 612. Video decoder 300 may determine which reference templates within search area 608 substantially match (e.g., having lowest value of a cost function) current templates 602 and 604 within a current picture that includes current block 600. Video decoder 300 may determine the motion vector for the current block based on the determined reference templates, in accordance with template matching techniques.

As described in more detail below, the example techniques of this disclosure describe the use of template matching in CIIP mode and GPM. For instance, in CIIP, video decoder 300 may determine an inter predictor, and video decoder 300 may determine the motion vector that identifies the inter predictor using template matching techniques. For GPM, video decoder 300 may partition the current block into a first partition and a second partition. Video decoder 300 may utilize template matching techniques to determine the motion vector for the first partition and for the second partition.

The following describes combined Inter/Intra Prediction (CIIP). In VVC, when a CU is coded in merge mode, an additional flag is signaled to indicate if the combined inter/intra prediction (CIIP) mode is applied to the current CU. The CIIP prediction combines an inter predictor with an intra predictor. The inter predictor in the CIIP mode $P_{inter}$ is derived using the same inter prediction process applied to regular merge mode, and the intra predictor $P_{intra}$ is derived following the regular intra prediction process with the planar mode. Then, the intra and inter predictors are combined using weighted averaging. In Zhao et. al, "Non-CE: Weighted intra and inter prediction mode," Joint Video Experts Team (JVET) of ITU-T SG 16 WP 3 and ISO/IEC JTC 1/SC 29/WG 11, 15th Meeting: Gothenburg, SE, 3-12 Jul. 2019, JVET-O0537, an extended CIIP was proposed to apply the position dependent prediction combination (PDPC) mode to the regular merge mode. This CIIP-PDPC combines the inter predictors with the above reconstructed sample R(x, −1) and the left reconstructed sample R(−1, y), where (x, y) is the coordinate relative to the most top-left sample, defined to be (0, 0), in the current CU.

Figure 7:
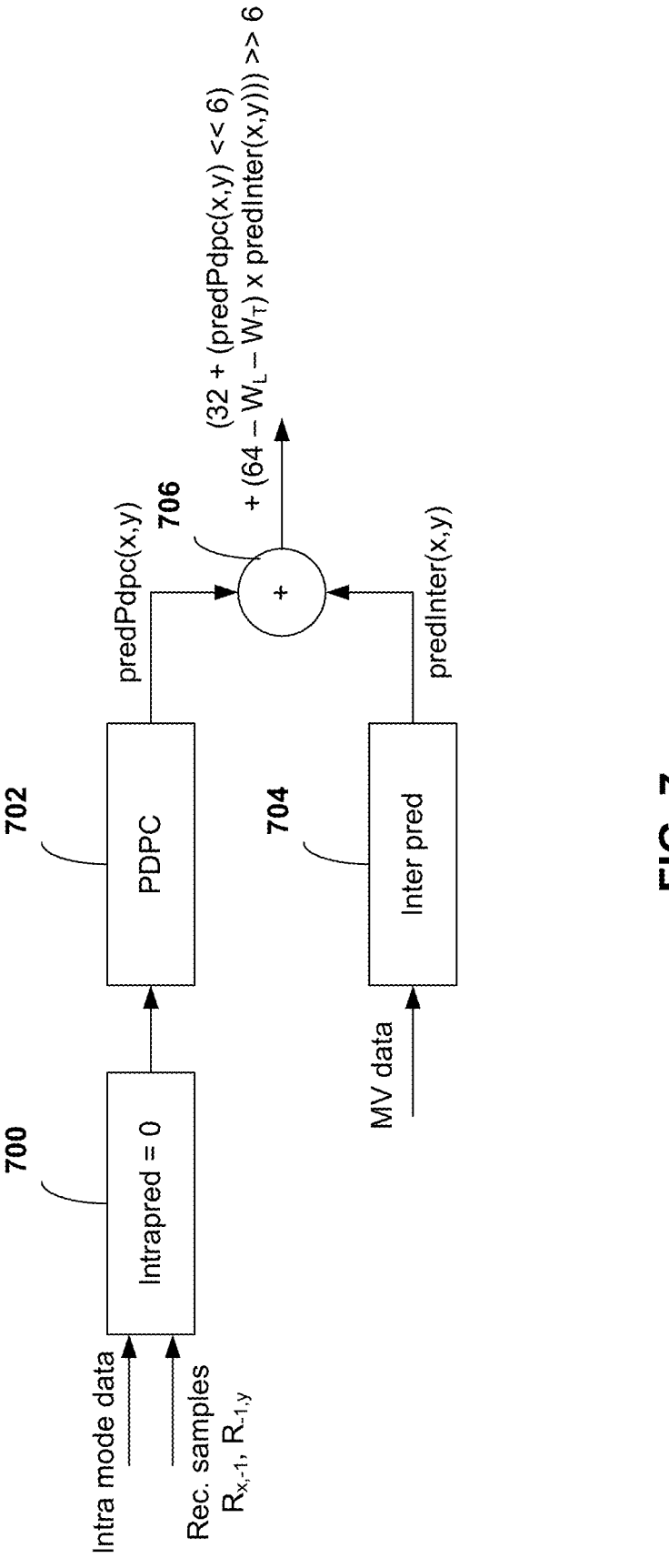
FIG. 7 is a flowchart illustrating an example of extended combined inter/intra prediction (CIIP) using position dependent prediction combination (PDPC).

The flowchart of the prediction of the CIIP with PDPC mode can be depicted in FIG. 7, where WT and WL are the weighted values which depend on the sample position in the block as defined in PDPC. In some examples, the weighting values for CIIP with Planar mode and CIIP with PDPC mode are different.

For instance, as illustrated in FIG. 7, video decoder 300 may determine an intra prediction block using planar mode (700). If PDPC is enabled, video decoder 300 may determine the intra predictor using PDPC.

Video decoder 300 may determine motion vector information for the current block. For example, video decoder 300 may construct a merge candidate list that includes motion vector information of spatially and temporally neighboring blocks. Video decoder 300 may receive an index into the merge candidate list, and determine the motion vector information (e.g., MV data in FIG. 7) based on the index. Video decoder 300 may determine an inter predictor (704) based on the motion vector information.

Video decoder 300 may then combine the intra predictor and the inter predictor (706). For instance, FIG. 7 illustrates an example of the equation and weights that video decoder 300 may apply to combine the intra predictor and inter predictor. The result may be the prediction block that video decoder 300 utilizes for reconstructing the current block.

In accordance with examples described in this disclosure, template matching may be enabled for a current block inter-predicted in CIIP mode. For instance, video decoder 300 may determine that the current block is inter-predicted in CIIP mode based on information signaled in a bitstream. In addition, video decoder 300 may determine that template matching is enabled for the current block, such as based on a CU level syntax element (e.g., flag) indicating that template matching is enabled for the current block.

Video decoder 300 may generate a motion vector for the current block based on template matching. For example, video decoder 300 may determine an initial motion vector for the current block based on motion information in a merge candidate list. Video decoder 300 may receive an index into the merge candidate list that identifies the motion information (e.g., motion vector information). For generating the motion vector for the current block based on template matching, video decoder 300 may determine a search area in a reference picture based on the initial motion vector, determine reference templates within the search area that substantially match current templates within a current picture that includes the current block, and determine the motion vector for the current block based on the determined reference templates.

For CIIP mode, video decoder 300 may determine a prediction bock for the current block based on the motion vector in accordance with CIIP mode. For example, video decoder 300 may determine an inter-predictor based on the generated motion vector, and determine an intra-predictor based on samples neighboring the current block. Video decoder 300 may combine the inter-predictor and the intra-predictor to determine the prediction block (e.g., as illustrated in FIG. 7).

Figure 8A:
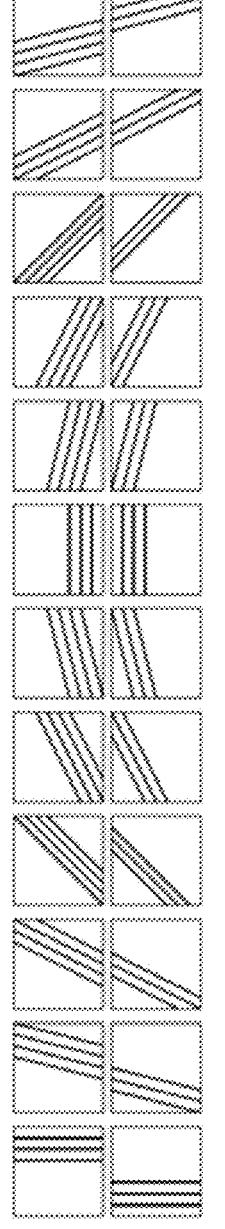
FIG. 8A is a conceptual diagram illustrating examples of different partitions for geometric partitioning mode (GPM).

The following describes geometric partitioning mode (GPM). In VVC, a geometric partitioning mode is supported for inter prediction. The geometric partitioning mode is signaled using a CU-level flag as one kind of merge mode, with other merge modes including the regular merge mode, the MMVD mode, the CIIP mode and the subblock merge mode. In total 64 partitions are supported by geometric partitioning mode for each possible CU size $w \times h = 2^m \times 2^n$ with m, $n \in \{3 \ldots 6\}$ excluding 8×64 and 64×8. When this mode is used, a CU is split into two parts by a geometrically located straight line shown in FIG. 8A.

The location of the splitting line is mathematically derived from the angle and offset parameters of a specific partition. Each part of a geometric partition (e.g., each partition) in the CU is inter-predicted using its own motion.

In some examples, only uni-prediction is allowed for each partition, that is, each part has one motion vector and one reference index. The uni-prediction motion for each partition is derived as follows.

Figure 8B:
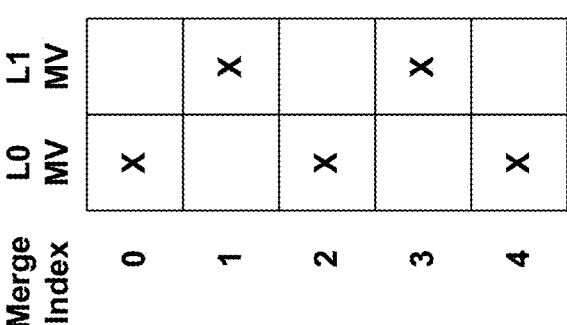
FIG. 8B is a table illustrating example of merge index for determining motion vector for GPM.

The uni-prediction candidate list is derived directly from the merge candidate list constructed as in merge mode, as illustrated in FIG. 8B. Denote n as the index of the uni-prediction motion in the geometric uni-prediction candidate list. The LX motion vector of the n-th merge candidate, with X equal to the parity (even or odd) of n, is used as the n-th uni-prediction motion vector for geometric partitioning mode. These motion vectors are marked with "x" in FIG. 8B. In case a corresponding LX motion vector of the n-the extended merge candidate does not exist, the L(1−X) motion vector of the same candidate is used instead as the uni-prediction motion vector for geometric partitioning mode.

If geometric partitioning mode is used for the current CU, then a geometric partition index indicating the partition mode of the geometric partition (angle and offset), and two merge indices (one for each partition) are further signaled. The number of maximum GPM candidate size is signaled explicitly in SPS and specifies syntax binarization for GPM merge indices. After predicting each of part of the geometric partition, the sample values along the geometric partition edge are adjusted using a blending processing with adaptive weights.

In accordance with examples described in this disclosure, template matching may be enabled for a current block inter-predicted in GPM. For instance, video decoder 300 may determine that the current block is inter-predicted in GPM based on information signaled in the bitstream. In addition, video decoder 300 may determine that template matching is enabled for the current block, such as based on a CU level syntax element (e.g., flag) indicating that template matching is enabled for the current block.

Video decoder 300 may generate a motion vector (e.g., at least one motion vector) for the current block based on template matching. For example, video decoder 300 may partition the current block into a first partition and a second partition. Video decoder 300 may generate the motion vector (e.g., at least one motion vector) by generating a first motion vector for the first partition of the current block. Video decoder 300 may also generate a second motion vector for the second partition of the current block based on template matching and based on the determination that template matching is enabled for the current block.

There may be various ways in which video decoder 300 may determine the first motion vector for the first partition based on template matching, and determine the second motion vector for the second partition based on template matching. As an example, video decoder 300 may perform the example operations described above with respect to FIG. 6 twice: once for the first partition, and again for the second partition.

For example, to generate the motion vector for the current block based on template matching, video decoder 300 may be configured to determine a first initial motion vector for the first partition based on first motion information in a merge candidate list, determine a first search area in a first reference picture based on the first initial motion vector, determine first reference templates within the first search area that substantially match first current templates of the first partition, and determine a first motion vector for the first partition based on the determined first reference templates.

Video decoder 300 may also determine a second initial motion vector for the second partition based on second motion information in the merge candidate list, determine a second search area in a second reference picture based on the second initial motion vector, determine second reference templates within the second search area that substantially match second current templates of the second partition, and determine a second motion vector for the second partition based on the determined second reference templates, For GPM, video decoder 300 may determine a prediction block for the current block based on the motion vector in accordance with GPM. For instance, video decoder 300 may determine the prediction block based on the first motion vector, or based on the first motion vector and the second motion vector, where the first motion vector and the second motion vector are generated using template matching. As an example, video decoder 300 may determine a first prediction partition based on the first motion vector, determine a second prediction partition based on the second motion vector, and combine the first prediction partition and the second prediction partition to determine the prediction block.

Figure 9A:
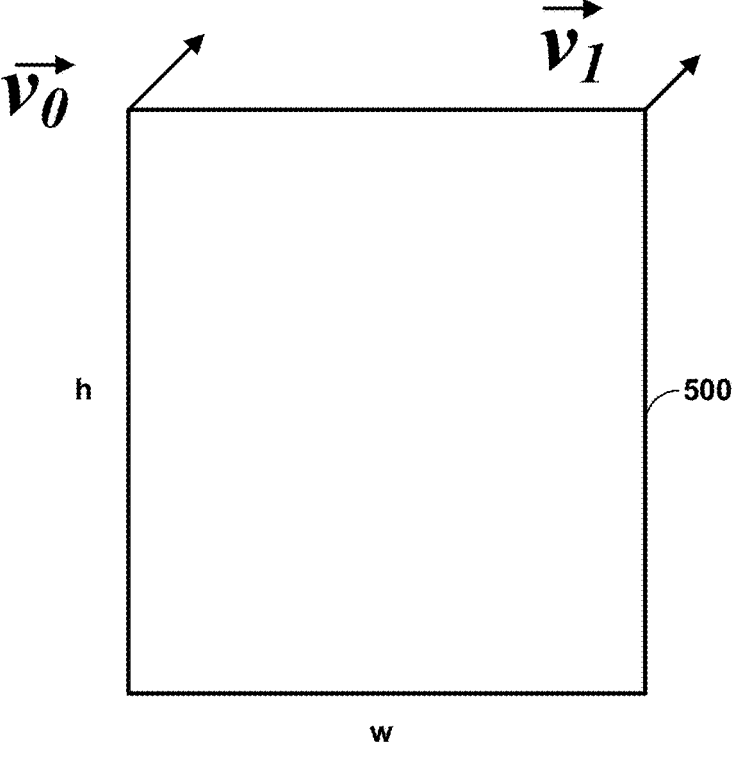
FIG. 9A is a conceptual diagram illustrating an example of a 4-parameter affine model.
Figure 9B:
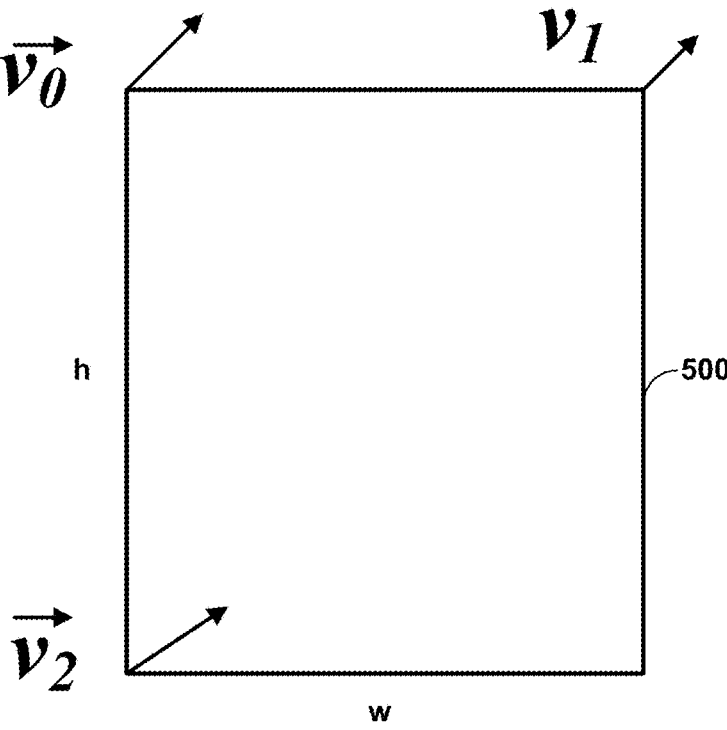
FIG. 9B is a conceptual diagram illustrating an example of a 6-parameter affine mode.

The following describes affine prediction. In some techniques, only translation motion model is applied for motion compensation prediction (MCP). While in the real world, there are many kinds of motion, e.g., zoom in/out, rotation, perspective motions and the other irregular motions. In the VTM-6, a block-based affine transform motion compensation prediction is applied. As shown in FIGS. 9A and 9B, the affine motion field of the block is described by motion information of two control point (also called 4-parameter model), in FIG. 9A, or three control point motion vectors (also called 6-parameter model), in FIG. 9B.

For 4-parameter affine motion model, motion vector at sample location (x, y) in a block is derived as:

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1y} - mv_{0x}}{W}y + mv_{0y} \end{cases}$$

For 6-parameter affine motion model, motion vector at sample location (x, y) in a block is derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases}$$

In the above for 4-parameter and 6-parameter, $(mv_{0x}, mv_{0y})$ is motion vector of the top-left corner control point, $(mv_{1x}, mv_{1y})$ is motion vector of the top-right corner control point, and $(mv_{2x}, mv_{2y})$ is motion vector of the bottom-left corner control point.

Figure 10:
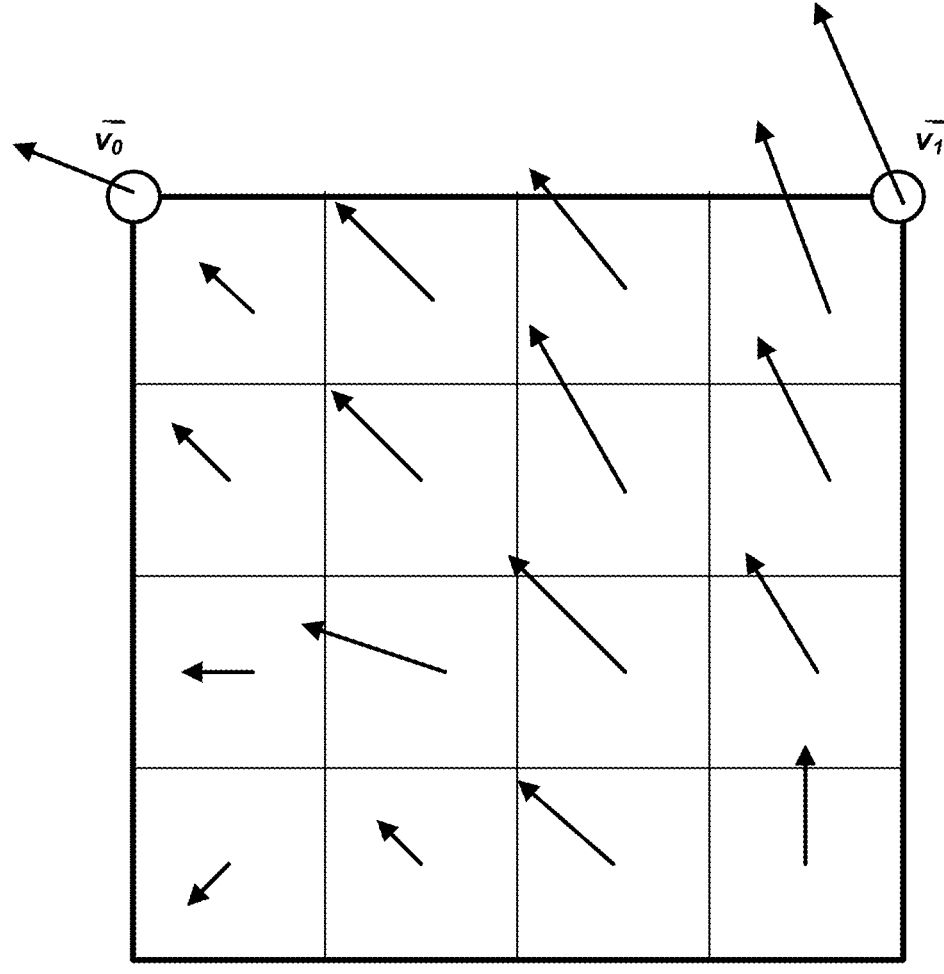
FIG. 10 is a conceptual diagram illustrating an example of an affine motion vector field per sub-block.

To simplify the motion compensation prediction, block based affine transform prediction is applied. To derive motion vector of each 4×4 luma sub-block, the motion vector of the center sample of each sub-block, as shown FIG. 10, is calculated according to above equations, and rounded to $\frac{1}{16}$ fraction accuracy. Then the motion compensation interpolation filters are applied to generate the prediction of each sub-block with derived motion vector. The sub-block size of chroma-components is also set to be 4×4. The MV of a 4×4 chroma sub-block is calculated as the average of the MVs of the four corresponding 4×4 luma sub-blocks.

In accordance with the techniques of this disclosure, template matching (TM) refinement is applied to inter modes such as CIIP, GPM, and MHP. A flag may be introduced and signaled in a bitstream, for example on a block basis, to indicate whether such TM refinement is applied. That is, video decoder 300 may determine that template matching is enabled for the current block by receiving a CU level syntax element (e.g., flag) indicating that template matching is enabled for the current block.

In another example, a combination of flags may be introduced. One set of flags is signaled in parameter set(s), such as VPS, SPS, PPS to indicate whether TM refinement is performed to inter modes. The second set of flags is signaled in picture or slice headers to indicate whether TM refinement is performed to a picture or slice. The third set of flags is signaled on a block basis to indication whether TM refinement is applied to a block. The signaling of the second set of flags may depend on whether TM refinement is enabled in the first set of flags. The signaling of the third set of flags may depend on whether TM refinement is enabled in the first set of flags and/or the second set of flags.

For example, this disclosure describes a video coder (e.g., video encoder 200 or video decoder 300) configured to code (e.g., encode or decode) one or more syntax elements indicating that template matching (also called template matching refinement) is enabled for a block inter-predicted in at least one of combined inter/intra prediction (CIIP), geometric partitioning mode (GPM), or multi-hypothesis prediction (MHP) inter-prediction modes, and code the block utilizing template matching. As one example, to code the one or more syntax elements, video decoder 300 may be configured to parse and decode the one or more syntax elements, and to code the block, video decoder 300 may be configured to decode the block. As another example, to code the one or more syntax elements, video encoder 200 may encode and signal the one or more syntax elements, and to code the block, video encoder 200 may be configured to encode the block.

In some examples, the one or more syntax elements comprise a flag indicating that template matching is enabled. In some examples, the one or more syntax elements comprises one or a combination of a first set of flags indicating that template matching is enabled for inter modes, a second set of flags indicating that template matching refinement is enabled for a picture or a slice that includes the block, and at least a third flag indicating that template matching refinement is enabled for the block.

The TM refinement may be context coded and context of the flag can be shared across different inter modes or can be inter mode specific. For example, one context is assigned to code the TM refinement flag for CIIP mode, another context is assigned to code the TM refinement flag for GMP mode and yet another context is assigned to signal TM refinement flag for MHP.

For example, the block in the above example may be a first block and the one or more syntax elements may be a first set of one or more syntax elements. The video coder may be configured to code a second set of one or more syntax elements indicating that template matching refinement is enabled for a second block inter-predicted in at least one of the CIIP, GPM, or HMP inter-prediction modes. The first block may be inter-predicted in at least one of the CIIP, GPM, or HMP inter-prediction modes, and the second block may be inter-predicted in at least another one of the CIIP, GPM, or HMP inter-prediction modes.

The video coder may be configured to context-based code the first set of one or more syntax elements, and context-based code the second set of one or more syntax elements. In one example, a context for coding at least one of the first set of one or more syntax elements is the same as a context for coding at least one of the second set of one or more syntax elements. In one example, a context for coding at least one of the first set of one or more syntax elements is different than a context for coding at least one of the second set of one or more syntax elements.

Each inter mode (e.g., inter-prediction mode) may have other parameters associated with the mode (e.g., associated with the inter-prediction mode), which are signaled in a bitstream. For example, MV candidate index.

Those parameters may be context coded and one set of context may be used when TM refinement is disabled (TM refinement flag is 0), and another set of contexts may be used when TM refinement is enabled (TM refinement flag is 1). In some examples, the contexts can be split (i.e., being separated) based on the TM refinement flag only for the first several bins of the inter mode parameters after binarization, and contexts for other later bins are shared between the cases when TM refinement is applied and not applied. In some examples, the inter mode parameters are signaled using the same set of contexts regardless of the TM refinement.

For example, in the above examples, the block may be considered as a first block. The video coder may be configured to context-based code one or more parameters associated with an inter-prediction mode in which the first block is inter-predicted, code a second block in at least one of CIIP, GPM, or MHP inter-prediction modes, with template matching refinement disabled. In this example, the inter-prediction mode for the first block and the second block may be the same. The video coder may context-based code one or more parameters associated with the inter-prediction mode in which the second is inter-predicted.

In some examples, a context associated with context-based coding the one or more parameters for the first block is different than as a context associated with context-based coding the one or more parameters for the second block. In some examples, a context associated with context-based coding the one or more parameters for the first block is the same than as a context associated with context-based coding the one or more parameters for the second block. In some examples, a context associated with context-based coding a first set of bins for the one or more parameters for the first block is the same as a context associated with context-based coding a first set of bins for the one or more parameters for the second block, and a context associated with context-based coding at least one bin in a second set of bins for the one or more parameters for the first block is different than a context associated with context-based coding at least one bin in a second set of bins for the one or more parameters for the second block.

The example techniques described in this disclosure can be applied individually or in any combination.

The following describes CIIP with template matching. In this disclosure, a new CIIP mode is described to combine an intra mode with either regular merge mode or TM merge mode. In one example, 4 CIIP modes are proposed as follows:

a. Combined Planar mode and regular merge mode;
    b. Combined PDPC mode and regular merge mode;
    c. Combined Planar mode and TM merge mode;
    d. Combined PDPC mode and TM merge mode.

For instance, in one or more examples described in this disclosure, video encoder 200 and video decoder 300 may support a CIIP mode that includes combined planar mode and template matching TM merge mode and support a CIIP mode that includes combined PDPC mode and TM merge mode. For example, video encoder 200 and video decoder 300 may determine that the current block is inter-predicted in CIIP mode (e.g., CIIP mode that includes combined planar mode and TM merge mode or CIIP mode that includes combined PDPC mode and TM merge mode). For instance, video encoder 200 may signal and video decoder 300 may receive one syntax element indicating that the current block is inter-predicted in CIIP mode, and video encoder 200 may signal and video decoder 300 may receive a CU level syntax element (e.g., flag) indicating that template matching is enabled for the current block.

Video encoder 200 and video decoder 300 may generate the motion vector for the current block based on template matching. For example, video encoder 200 and video decoder 300 may determine an initial motion vector for the current block based on motion information in a merge candidate list. Video encoder 200 may signal an index into the merge candidate list, and video decoder 300 may receive the index into the merge candidate list.

For template matching, video encoder 200 and video decoder 300 may determine a search area in a reference picture based on the initial motion vector. Video encoder 200 and video decoder 300 may determine reference templates within the search area that substantially match current templates within a current picture that includes the current block. Video encoder 200 and video decoder 300 may determine the motion vector for the current block based on the determined reference templates.

Video encoder 200 and video decoder 300 may determine a prediction block for the current block in accordance with CIIP mode. For instance, video encoder 200 and video decoder 300 may determine an inter-predictor based on the generated motion vector. Video encoder 200 and video decoder 300 may determine an intra-predictor based on samples neighboring the current block (e.g., in accordance with planar mode or PDPC mode). Video encoder 200 and video decoder 300 may combine the inter-predictor and the intra-predictor to determine the prediction block.

Video encoder 200 may signal residual information indicative of a difference between the prediction block and the current block. Video decoder 300 may receive the residual information indicative of a residual between the current block and the prediction block, and sum the residual and the prediction block to reconstruct the current block.

In some examples, CIIP mode (a) and CIIP mode (c) may share a first set of weighting factors, and CIIP mode (b) and CIIP mode (d) may share a second set of weighting factors. If CIIP is enabled for this CU, an index with one of binarization 0, 10, 110, 111 is signaled to indicate which CIIP mode is used. In some examples, a TM merge flag is signaled to indicate if TM merge mode is used to generate inter predictors for this CIIP mode, and a PDPC flag is also signaled to indicate if PDPC mode is used to generate intra predictors for this CIIP mode. Some example techniques include signaling a CIIP flag if the TM merge flag is true, and a PDPC flag is further signaled if CIIP flag is true.

In some examples, there are three different merge list as shown below:

a. Regular merge candidate list with P candidates
b. TM merge candidate list with Q candidates
c. CIIP TM merge candidate list with R candidates In some examples, P, Q, and R should be larger than or equal to 1. In List (b), video encoder 200 or video decoder 300 first generates Q initial regular merge candidates, and then the MV of each candidate is refined by either TM or combined BDMVR and TM as proposed in JVET-U0100. In the proposed List (c), video encoder 200 or video decoder 300 first generates R initial regular merge candidates, and then the MV of each candidate is refined by TM. In some examples, at least two of P, Q, and R can be the same values.

For example, for template matching, video encoder 200 and video decoder 300 may construct a merge candidate list. Video encoder 200 may signal and video decoder 300 may receive information indicative of an index into the merge candidate list. Video decoder 300 may determine an initial motion vector based on the index into the merge candidate list. For instance, video encoder 200 may determine the initial motion vector and determine the index into the merge candidate list based on the location of the initial motion vector in the merge candidate list. For CIIP mode with template matching enabled, the number of candidates in the merge candidate list is R candidates. P and Q refer to a number of candidates in the merge candidate list for where CIIP mode is not enabled.

As an illustration, assume that the current block is a first block, and that the current block is inter-predicted in the CIIP mode with template matching enabled. In this example, video encoder 200 and video decoder 300 may construct a first merge candidate list having a first number of candidates (e.g., R number of candidates). A second merge candidate list for a second block that is inter-predicted in CIIP mode with template matching disabled includes a second number of candidates (e.g., P number of candidates). The first number of candidate is different than the second number of candidates. As another example, a second merge candidate list for a second block that is not inter-predicted in CIIP mode includes a second number of candidates (e.g., P or Q number of candidates).

The candidate indexes of List (a) and List (b) are coded with Truncated Unary Binarization, and the first M bins are context coding. In some examples, the candidate index of CIIP TM merge candidates in List (c) is signaled with Truncated Unary Binarization. One example is if R=6, 0, 10, 110, 1110, 11110, and 11111 are used as binarization for the candidate indexes 0, 1, 2, 3, 4, and 5. In some examples, the first M bins of a CIIP TM merge candidate are context coding, and share the same contexts that are used in candidate index coding for regular merge list (a). In some examples, the first M bins of a CIIP TM merge candidate are context coding, and share the same contexts that are used in candidate index coding for TM merge list (b). In some examples, the first M bins of a CIIP TM merge candidate are context coding, and the contexts are different from the contexts used in the candidate indexes for List (a) and List (b).

That is, as part of receiving information indicative of the index into the merge candidate list, video decoder 300 may be configured to determine contexts for a first M bins of the information, where the contexts for the first M bins are the same as contexts for the M bins for an index into the second merge candidate list. In this example, the first merge candidate list is the merge candidate list for the current block that is inter-predicted in CIIP mode with template matching enabled. The second merge candidate list is a hypothetical list that would be generated for a second block that is inter-predicted in CIIP mode with template matching disabled (e.g., regular inter-prediction) or for a block that is not inter-predicted with CIIP mode (e.g., regular inter-prediction with template matching). The contexts for decoding the first M bins for an index into the first merge candidate list and the second merge candidate list may be the same. Video decoder 300 may context-based decode the information based on the determined contexts.

In some examples, 2 CIIP modes may be as follows: (1) Combined Planar mode and regular merge mode; (2) Combined Planar mode and TM merge mode. If CIIP is enabled for this CU, a TM merge flag is signaled to indicate if TM merge mode is used to generate inter predictors for this CIIP mode.

In some examples, 2 CIIP modes may be as follows: (1) Combined Planar mode and regular merge mode; (2) Combined PDPC mode and TM merge mode. If CIIP is enabled for this CU, a CIIP mode flag is signaled to indicate which CIIP mode is used.

In some examples, 2 CIIP modes may be as follows: (1) Combined PDPC mode and regular merge mode; (2) Combined PDPC mode and TM merge mode. If CIIP is enabled for this CU, a TM merge flag is signaled to indicate if TM merge mode is used to generate inter predictors for this CIIP mode.

The following describes GPM with template matching. In this disclosure, the template matching (TM) refinement is applied to GPM mode. The refinement is applied to motion vector candidates. A flag may be signaled to indicate whether TM refinement is applied.

The derivation of motion vector (MV) candidates in GPM mode may include 2 steps: deriving merge MV candidates and deriving uni-directional MV candidates from the merge MV candidates for GPM partitions.

Template matching refinement can be applied at different GPM MV construction stages. For example, GPM MV candidates construction is kept unmodified. Keeping GPM MV candidates unmodified may provide the advantage that GPM mode has the same MV candidates construction process regardless of the TM refinement flag.

Then TM refinement is applied to a uni-directional GPM MV candidate using current block and reference block templates for matching process. The refined MV may be used as a candidate to form GPM prediction.

In one example, the TM refinement is performed only to GPM partitions, which have neighboring blocks as TM refinement needs the reconstructed neighbor template. In one example, MV is derived for each GPM partition using the reconstructed CU neighbor samples even the partition does not neighbor those samples.

For example, assume that the current block is inter-predicted in GPM. In this example, video encoder 200 and video decoder 300 may partition the current block into a first partition and a second partition. As described above, video encoder 200 and video decoder 300 may be configured to generate a motion vector for the current block based on template matching. For GPM, to generate the motion vector for the current block, video encoder 200 and video decoder 300 may generate a first motion vector for the first partition based on template matching. In one or more examples, video encoder 200 and video decoder 300 may generate a second motion vector for the second partition based on template matching and based on the determination that template matching is enabled for the current block.

As an example, for GPM with template matching, video decoder 300 may determine a first initial motion vector for the first partition based on first motion information in a merge candidate list (e.g., based on receiving a first index in the merge candidate list). Video decoder 300 may determine a first search area in a first reference picture based on the first initial motion vector, determine first reference templates within the first search area that substantially match first current templates of the first partition, and determine a first motion vector for the first partition based on the determined first reference templates. Similarly, video decoder 300 may determine a second initial motion vector for the second partition based on second motion information in the merge candidate list (e.g., based on receiving a second index in the merge candidate list). Video decoder 300 may determine a second search area in a second reference picture based on the second initial motion vector, determine second reference templates within the second search area that substantially match second current templates of the second partition, and determine a second motion vector for the second partition based on the determined second reference templates.

For GPM, video encoder 200 and video decoder 300 may determine a first prediction partition based on the first motion vector, and determine a second prediction partition based on the second motion vector. Video encoder 200 and video decoder 300 may combine the first prediction partition and the second prediction partition to determine the prediction block for the current block. Video encoder 200 may signal residual information indicative of a difference in sample values between the prediction block and the current block. Video decoder 300 may receive the residual information indicative of a residual between the current block and the prediction block, and sum the residual and the prediction block to reconstruct the current block.

In some examples, the TM refinement is performed only to certain subset of GPM split modes. For example, some certain split angles with offset toward bottom-right of the CU, which will result in a small partition in the bottom-right of the CU. Signaling of GPM split mode or TM merge flag can be modified accordingly to save signaling overhead.

In some examples, TM refinement process can be performed to merge MV candidates before constructing GPM uni-directional MV candidates, in one example by using parity. The TM refinement applied to merge MV candidates can be the same as the TM refinement process applied in the merge mode. In this case, the merge MV derivation process can be shared between merge mode and GPM mode and total number of TM refinement steps may be reduced. Uni-directional GPM candidates are derived after TM refinement process.

In some examples, TM refinement is performed to certain MV candidates, for example based on MV candidate index. For example, TM refinement is applied to every second MV candidate, or applied to MV candidates with MV candidate index greater than a threshold. In one example, the threshold can be equal to the half of the MV candidates number. In this case, the TM refinement flag may not be needed as whether TM refinement process is applied or not depends on the MV candidate index.

In some examples, a first flag may be signaled to indicate whether TM refinement is applied to the current GPM coded block. If the first flag is true, then a second flag is signaled to indicate whether TM refinement is applied to the first GPM partition and a third flag is signaled to indicate whether TM refinement is applied to the second GPM partition. If the first flag is false, then the second and third flags are not signaled and are inferred to be false, i.e. TM is not applied. In some examples, if the first flag is true and the second flag is false, the third flag is not signaled and is inferred to be true, i.e. TM is applied to the second partition.

In some examples, a first flag may be signaled to indicate whether TM refinement is applied to the current GPM coded block. If the first flag is true, TM refinement may be applied. For each GPM partition, whether TM refinement is applied is determined by the merge index. For example, if the merge index is smaller than a threshold, TM refinement is applied. In another example, if the merge index is larger than a threshold, TM refinement is applied. In some examples, the merge list may be different from the merge list when the first flag is false. In some examples, the merge list is constructed by picking a subset of candidates from the merge list that is used when the first flag is false. Some reordering of the candidates may be applied. The reordering may be based on the TM cost of the merge candidates.

In some examples, when both the first and second GPM coded blocks do not apply template matching, the merge indices of two GPM coded blocks are disallowed to be identical. When one of the two GPM coded blocks applies the template matching and the other does not, the merge indices of two GPM coded blocks can be identical. When both of two GPM coded blocks apply the template matching, the merge indices are allowed to be the same when the MVs of two coded blocks after template matching are different.

The following describes MHP with template matching. In U.S. Provisional Application No. 63/167,480, filed Mar. 29, 2021, merge mode can be applied to the additional hypothesis in multi-hypothesis prediction. In some examples, the same merge candidates list as in GPM is used.

In this disclosure, the template matching (TM) refinement is also applied to GPM mode. The refinement may be applied to motion vector candidates.

In one method, similar description in U.S. Provisional Application No. 63/167,480 (e.g., as related to AMVR), a flag may be signaled to indicate whether TM refinement is applied. The merge mode in MHP shares the same merge candidate list(s), the methods described in U.S. Provisional Application No. 63/167,480, such as the description for AMVR, can be applied to MHP's merge mode for the additional hypothesis.

In some examples, only the TM refined merge candidate is used for MHP merge mode. The same examples as in U.S. Provisional Application No. 63/167,480 (e.g., description of AMVR) can be applied. For example, the same TM refined merge candidates list as in GPM is used for MHP merge mode.

The following describes TM merge candidates. This disclosure describes examples to swap the spatial MVP from Above neighbor CU and the spatial MVP from Left neighbor CU in the TM merge candidate list if the following conditions are true:
  a. The maximum number of TM merge candidates is larger than 1
  b. The slice is B slice
  c. The MV information of Above neighbor CU and the MV information of Left neighbor CU are available
  d. Above neighbor CU is coded by uni-direction inter prediction
  e. Left neighbor CU is coded by bi-direction inter prediction If the spatial neighboring CU is Above (A) or Left (L), the spatial neighboring CU is coded by uni-direction inter prediction, and LIC flag is not enabled for this spatial neighboring CU, in some examples, the MVP of the spatial neighboring block is converted from uni-direction inter prediction coding to bi-direction inter prediction coding during TM merge list construction. Specifically, the conversion is as follows:
  a. If a reference picture in a first reference picture list is used for a spatial neighboring block, and the motion vector is defined as MV1, then bi-direction prediction is constructed for the spatial neighboring block by using the first entry of a second reference picture list and setting the motion vector MV2 to be −MV1.
  b. If a reference picture in a second reference picture list is used for a neighboring block, and the motion vector is defined as MV2, then bi-direction prediction is constructed for the spatial neighboring block by using the first entry of a first reference picture list and setting the motion vector MV1 to be −MV2.

In some examples, the spatial MVP from Left neighbor CU may be checked before the spatial MVP from the Above neighbor CU. The example techniques may swap the spatial MVP from Left neighbor CU and the spatial MVP from Above neighbor CU in the candidate list if the following conditions are true:
  a. The maximum number of TM merge candidates is larger than 1
  b. The slice is B slice
  c. The MV information of Above neighbor CU and the MV information of Left neighbor CU are available
  d. Left neighbor CU is coded by uni-direction inter prediction
  c. Above neighbor CU is coded by bi-direction inter prediction The techniques are not limited to Left neighbor CU and Above neighbor CU, but any two different spatial neighbor CUs can be applied. For example: Left neighbor CU and Above neighbor CU in this subsection can be replaced by Above-Right neighbor CU and Left-Below neighbor CU.

In another example, the swapping of the spatial MVP from Above neighbor CU and the spatial MVP from Left neighbor CU can be applied to both regular merge candidate list and TM merge candidate list.

In another example, M spatial MVPs from M neighboring CUs of regular merge candidate list and TM merge candidate list are reordered, respectively, during list constructions to have MVPs with bi-prediction placed in earlier entries in the separate list.

In another example, M spatial MVPs from M neighboring CUs of regular merge candidate list and N spatial MVPs from N neighboring CUs of TM merge candidate list are reordered, respectively, during list constructions to have MV candidates with bi-prediction placed in earlier entries in the separate list, where M is not equal to N.

The following describes GPM with affine and template matching. In some examples, the motion field of each GPM partition can be represented by using affine model. Similar to the candidates of GPM generated from translational model based merge candidates, video encoder 200 and video decoder 300 may generate the candidate list based on affine model merge candidates. Given an affine candidate list, the following are example techniques to convert this list to GPM candidate list (referred hereafter to as affine-based GPM merge candidate list):
  a. For each affine merge candidate in the affine candidate list, if it is with uni-prediction affine CPMVs (control point motion vectors), these CPMVs are inserted to an entry of affine-based GPM candidate list directly in order; otherwise, if it is with bi-prediction CPMVs, there are a few methods to handle this case, as follows:
    i. Some example techniques take L0 (reference picture list 0 or List 0) CPMVs and drop the CPMVs of the other reference picture list
    ii. Some example techniques take L1 (reference picture list 1 or List 1) CPMVs and drop the CPMVs of the other reference picture list;
    iii. Some example techniques take the CPMVs that are with a BCW weight larger than or equal to 0.5;
    iv. Some example techniques take the CPMVs that are with a BCW weight less than or equal to 0.5;
    v. Some example techniques take L0 CPMVs that are with an even candidate index (e.g., 0, 2, 4, . . . ) in the affine merge candidate list, and takes L1 CPMVs that are with an odd candidate index (e.g., 1, 3, 5, . . . ) in the affine candidate list;

vi. Some example techniques take L1 CPMVs that are with an even candidate index (e.g., 0, 2, 4, . . . ) in the affine merge candidate list, and takes L0 CPMVs that are with an odd candidate index (e.g., 1, 3, 5, . . . ) in the affine candidate list;

b. In addition to the aforementioned construction process of Affine-based GPM merge candidate list, each candidate in this list can be converted to 6-parameter model by using the same conversion as disclosed in U.S. Provisional Applications 63/173,861, filed Apr. 12, 2021, and 63/173,949, filed Apr. 12, 2021, if the candidate is with 4-parameter affine model.

When a GPM partition is represented by using affine model, then the motion field of that partition is filled by using the subblock MVs derived by using the CPMVs of that GPM partition. Although the CPMVs can derive subblock MVs for the whole CU, only the subblocks MVs that are located within the area of the GPM partition are considered and are filled into the motion field of the GPM partition. For each subblock located in the blending area of GPM-coded CU, it has two MVs, one from first GPM partition and the other from the second GPM partition, the same storage rule as translational model based GPM does is applied. In a subblock, when both MVs are from different reference picture lists, they are both stored in the motion field of the subblock; otherwise, when both MVs are from the same reference list, then the following example techniques may apply:

a. Some example techniques always store the MV from the first GPM partition and drops the other MV;

b. Some example techniques always store the MV from the second GPM partition and drops the other MV.

There may be several methods which may be applied to indicate the use of Affine-based GPM mode, as follows:

a. Some example techniques signal a CU-level flag to indicate that both GPM partitions are represented by using affine model.

b. Some example techniques signal a flag separately for each GPM partition to indicate the use of affine-based GPM merge mode, and thus video encoder 200 and video decoder 300 may determine which GPM partition is with affine motion model and which is not. When both flags are true, both GPM partitions' motion fields may be represented by using affine motion model. When one flag is true and the other is false, there may be only one GPM partition's motion field (with above mentioned flag equal to true) is represented by affine motion model, while the other partition's is represented by translational motion model. When both flags are false, the GPM infers motions in the same way as VVC does.

c. Some example techniques may signal a CU-level flag to indicate that at least one motion field of the GPM partitions is represented by using affine model. When the first flag is true, a second flag is signaled to indicate whether the first GPM partition is the one with its motion field represented by using affine motion model. If this second flag is false, then the second GPM partition's motion field is always represented by affine motion model; otherwise, if this second flag is true, then a third flag is signaled to indicate whether the second GPM partition is with affine.

d. Some example techniques signal a CU-level flag to indicate that at least one motion field of the GPM partitions is represented by using affine model. A second flag is signaled to indicate whether the first partition of GPM or the second one is with affine. In some examples, only one partition of GPM represents its motion field by using affine motion model, while the other represents its motion field by using translational motion model.

In addition, when both motion fields of the two GPM partitions are represented by using affine model, two different merge indices are signaled respectively for the two GPM partitions, each merge index of which is pointing to an entry of the affine-based GPM merge candidate list. When there is only a single GPM partition with its motion field represented by using affine motion model, a merge index of it (e.g., GPM partition) is signaled which points to an entry of the affine-based GPM merge candidate list, and the other merge index of the other GPM partition is signaled which points to an entry of the translational model based GPM merge candidate list. In some examples, the two merge candidate indices need not be always different from each other, since they (e.g., two merge candidate indices) are pointing to different merge candidate lists. When none of the GPM partitions represents its motion field by using affine motion model, GPM indices are signaled in the same way as VVC does.

In some examples, the MV and CPMVs of GPM partitions may be refined by using template matching. When the motion field of the GPM partition is represented by using translational motion model, the template matching applied may be the same as described above in the description of GPM with template matching. When the motion field of the GPM partition is represented by using affine model, the template matching based methods as described in U.S. Provisional Applications 63/173,861, filed Apr. 12, 2021, and 63/173,949, filed Apr. 12, 2021 can be applied to refine the CPMVs before they are used to derive subblock MVs of this GPM partition. As described above in GPM with template matching, a first flag may be signaled to indicate whether the CPMVs of GPM using Affine model are refined by template matching. In another embodiment, a second flag is signaled to indicate whether the CPMVs of a first GPM partition are refined by template matching, and a third flag is signaled to indicate whether the CPMVs of a second GPM partition are refined by template matching. In some examples, the second flag and the third flag are signaled if the first flag is true. If the first flag is true and the second flag is false, the third flag is not signaled, and is inferred to be true.

In some examples, suppose the first and second GPM coded blocks both apply Affine CPMVs to GPM candidate list. If the first and second GPM coded blocks do not apply template matching, the merge indices of two GPM with Affine coded blocks are disallowed to be identical. When one of the two GPM with Affine coded blocks applies the template matching and the other does not, the merge indices of two GPM with Affine coded blocks can be identical. When both of two GPM with Affine coded blocks apply the template matching, the merge indices are allowed to be the same when the CPMVs of two coded blocks after template matching are different.

In some examples, any motion candidate in translational model based GPM merge candidate list may be converted to be represented by using affine model through the template matching method specified in model conversion from translational model to affine model in U.S. Provisional Applications 63/173,861, filed Apr. 12, 2021, and 63/173,949, filed Apr. 12, 2021. When the motion information of a GPM motion partition is inferred from a translational motion model GPM merge candidate list and template matching is supposed to be enabled, regular template matching and affine-based template matching (as described in in U.S. Provisional Applications 63/173,861, filed Apr. 12, 2021, and 63/173,949, filed Apr. 12, 2021) are applied separately to the initial motion information of the GPM partition. The refining results of the one with lowest template matching cost is used to replace the initial motion information of the GPM partition.

In some examples, similar to examples above, any motion candidate in affine-based GPM merge candidate list may be converted to be represented by using translational model, when all its CPMVs are identical to each other. When the motion information of a GPM motion partition is inferred from an affine-based GPM merge candidate list and template matching is supposed to be enabled, regular template matching and affine-based template matching (as described in in U.S. Provisional Applications 63/173,861, filed Apr. 12, 2021, and 63/173,949, filed Apr. 12, 2021) are applied separately to the initial motion information of the GPM partition. The refining results of the one with lowest template matching cost is used to replace the initial motion information of the GPM partition.

Figure 2:
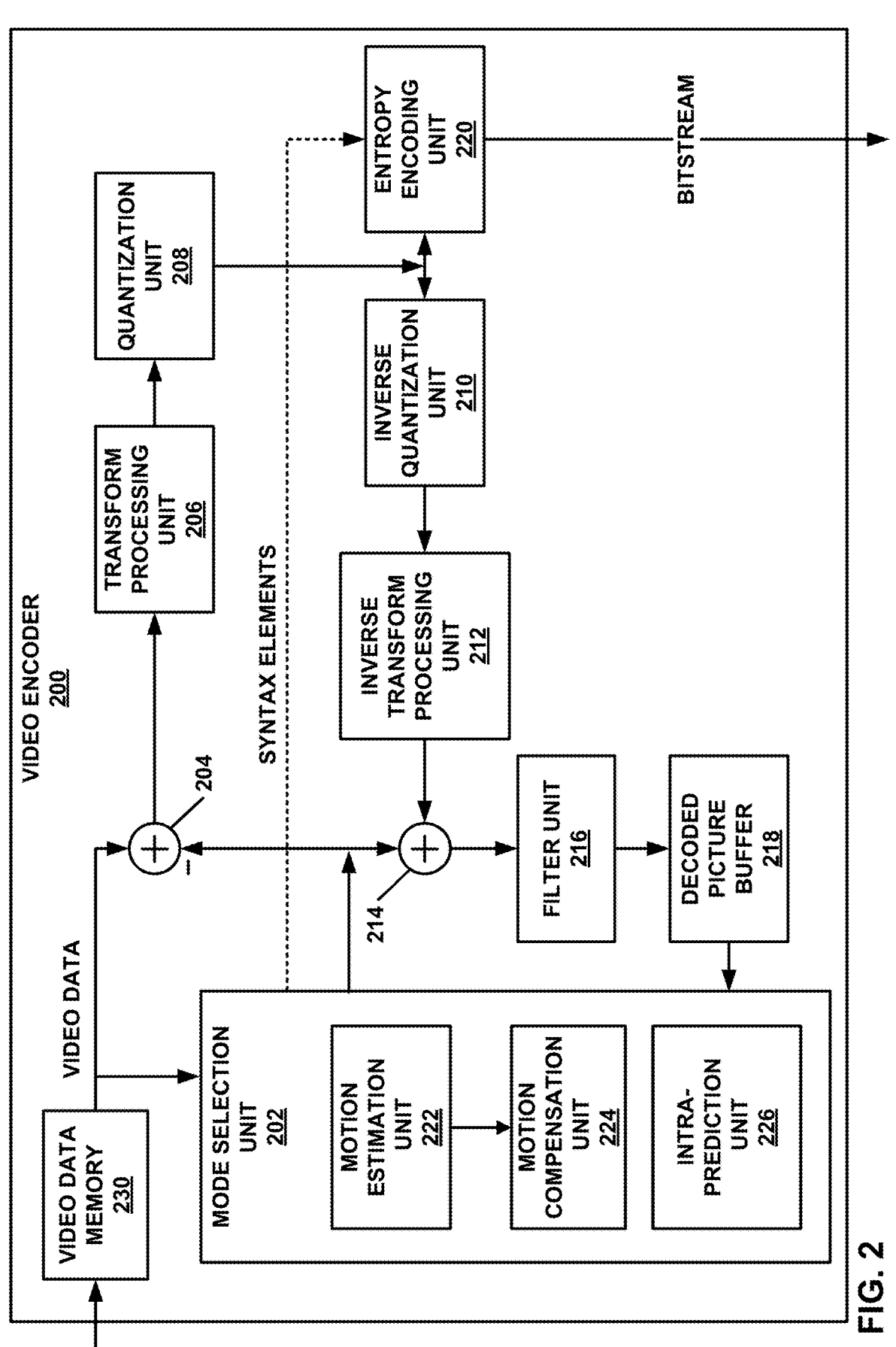
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards and video coding formats, such as AV1 and successors to the AV1 video coding format.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUS, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure, superblock structure, or the quadtree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to determine one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may determine a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to determine a motion vector (MV) and reference picture for a luma coding block need not be repeated for determining a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to code one or more syntax elements indicating that template matching refinement is enabled for a block inter-predicted in at least one of combined inter/intra prediction (CIIP), geometric partitioning mode (GPM), or multi-hypothesis prediction (MHP) inter-prediction modes, and code the block utilizing template matching refinement. For example, to code the one or more syntax elements, video encoder 200 may be configured to encode and signal the one or more syntax elements. To code the block, video encoder 200 may encode the block.

As one example, video encoder 200 may determine that a current block is to be inter-predicted in a combined inter-intra prediction (CIIP) mode or a geometric partition mode (GPM). For instance, mode selection unit 202 may determine cost functions for different prediction modes, and determine that the cost function associated with CIIP mode or GPM for the current block is the lowest. Video encoder 200 may also determine that template matching is to be enabled for the current block. For instance, mode selection unit 202 may determine cost functions for encoding the current block with template matching enabled and without template matching enabled, and determine that the cost function for inter-predicting the current block in CIIP mode or GPM with template matching enabled is the lowest.

Video encoder 200 may generate a motion vector for the current block based on template matching. For instance, video encoder 200 may construct a merge candidate list. Video encoder 200 may determine an initial motion vector based on motion vector information in the merge candidate list. Video encoder 200 may generate the motion vector by applying template matching based on the initial motion vector to generate the motion vector. Video encoder 200 may also signal information indicative of an index to the merge candidate list that identifies the motion vector information.

Video encoder 200 may determine a prediction block for the current block based on the motion vector in accordance with CIIP mode or GPM. For instance, for CIIP mode, video encoder 200 may generate the prediction block based on an intra predictor and an inter predictor (e.g., combine the intra predictor and the inter predictor). For GPM, video encoder 200 may generate a first prediction partition for a first partition of the current block based on a first motion vector that is generated based on template matching, and generate a second prediction partition for a second partition of the current block based on a second motion vector that is generated based on template matching. Video encoder 200 may combine the first prediction partition and the second prediction partition to determine the prediction block.

Video encoder 200 may signal information indicative of a residual between the prediction block and the current block. For instance, video encoder 200 may determine residual values (e.g., difference) on a sample-by-sample basis of the samples in the prediction block and the current block. Video encoder 200 may transform and quantize the residual values, and signal the resulting information.

Figure 3:
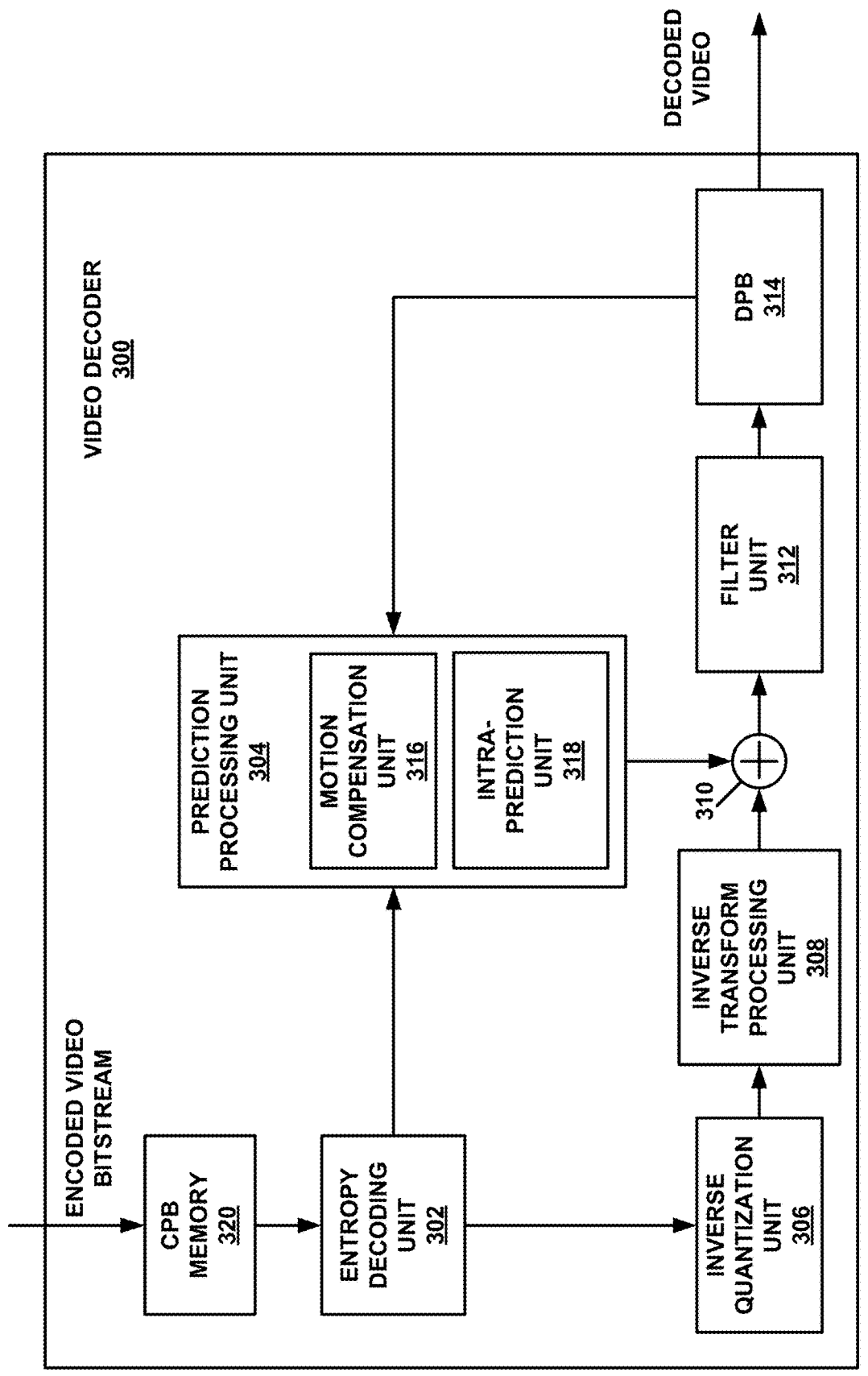
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to code one or more syntax elements indicating that template matching refinement is enabled for a block inter-predicted in at least one of combined inter/intra prediction (CIIP), geometric partitioning mode (GPM), or multi-hypothesis prediction (MHP) inter-prediction modes, and code the block utilizing template matching refinement. For example, to code the one or more syntax elements, video decoder 300 may be configured to parse and decode the one or more syntax elements. To code the block, video decoder 300 may decode the block.

For example, video decoder 300 may determine that a current block is inter-predicted in a combined inter-intra prediction (CIIP) mode or a geometric partitioning mode (GPM). For example, video decoder 300 may receive a syntax element indicating whether the current block is inter-predicted in CIIP mode, or may receive a syntax element indicating whether the current block is inter-predicted in GPM.

In accordance with one or more examples described in this disclosure, video decoder 300 may determine that template matching is enabled for the current block. For example, video decoder 300 may receive a CU level syntax element indicating that template matching is enabled for the current block. That is, template matching is enabled for the current block that is inter-predicted in CIIP mode or GPM.

Video decoder 300 may generate a motion vector for the current block based on template matching. For example, video decoder 300 may construct a merge candidate list, and receive information indicative of an index into the merge candidate list. Video decoder 300 may determine an initial motion vector based on the index into the merge candidate list. In such examples, to generate the motion vector, video decoder 300 may apply template matching based on the initial motion vector to generate the motion vector.

As an example, for CIIP mode, to generate the motion vector for the current block based on template matching, video decoder 300 may determine an initial motion vector for the current block based on motion information in a merge candidate list, determine a search area in a reference picture based on the initial motion vector, and determine reference templates within the search area that substantially match current templates within a current picture that includes the current block. Video decoder 300 may determine the motion vector for the current block based on the determined reference templates.

For GPM, to generate the motion vector for the current block based on template matching, video decoder 300 may determine a first initial motion vector for a first partition based on first motion information in a merge candidate list, determine a first search area in a first reference picture based on the first initial motion vector, determine first reference templates within the first search area that substantially match first current templates of the first partition (e.g., a difference in sample values in the template is less than a threshold value), and determine a first motion vector for the first partition based on the determined first reference templates. Video decoder 300 may also determine a second initial motion vector for a second partition based on second motion information in the merge candidate list, determine a second search area in a second reference picture based on the second initial motion vector, determine second reference templates within the second search area that substantially match second current templates of the second partition, and determine a second motion vector for the second partition based on the determined second reference templates.

Video decoder 300 may determine a prediction block for the current block based on the motion vector in accordance with CIIP mode or GPM. For example, for CIIP mode, video decoder 300 may determine an inter-predictor based on the generated motion vector, determine an intra-predictor based on samples neighboring the current block, and combine the inter-predictor and the intra-predictor to determine the prediction block. For GPM, video decoder 300 may determine a first prediction partition based on the first motion vector, determine a second prediction partition based on the second motion vector, and combine the first prediction partition and the second prediction partition to determine the prediction block.

In one or more examples, video decoder 300 may reconstruct the current block based on the prediction block. For example, video decoder 300 may receive information indicative of a residual between the current block and the prediction block, and sum the residual and the prediction block to reconstruct the current block.

Figure 4:
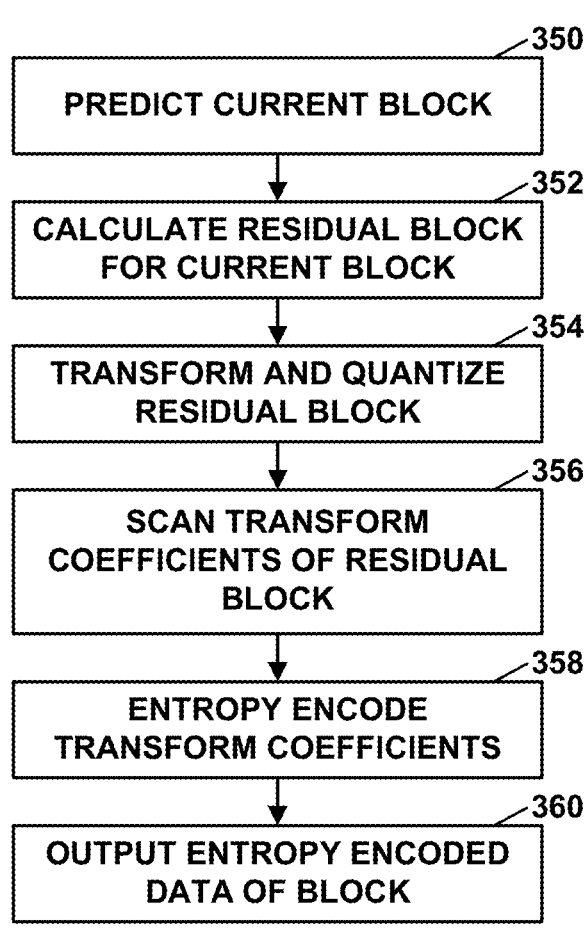
FIG. 4 is a flowchart illustrating an example method for encoding a current block in accordance with the techniques of this disclosure.

FIG. 4 is a flowchart illustrating an example method for encoding a current block in accordance with the techniques of this disclosure. The current block may comprise a current CU. Although described with respect to video encoder 200 (FIGS. 1 and 2), it should be understood that other devices may be configured to perform a method similar to that of FIG. 4.

In this example, video encoder 200 initially predicts the current block (350). For example, video encoder 200 may form a prediction block for the current block. In accordance with one or more examples described in this disclosure, video encoder 200 may form the prediction block for the current block using template matching techniques such as when the current block is inter-predicted in CIIP mode or GPM.

Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 5:
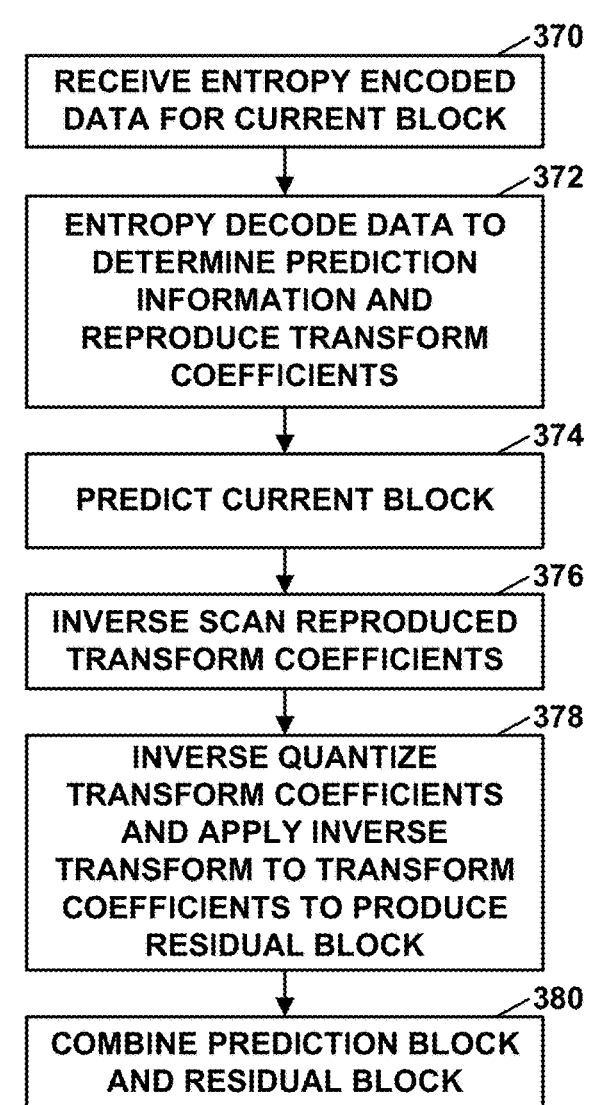
FIG. 5 is a flowchart illustrating an example method for decoding a current block in accordance with the techniques of this disclosure.

FIG. 5 is a flowchart illustrating an example method for decoding a current block of video data in accordance with the techniques of this disclosure. The current block may comprise a current CU. Although described with respect to video decoder 300 (FIGS. 1 and 3), it should be understood that other devices may be configured to perform a method similar to that of FIG. 5.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. For example, in accordance with one or more examples described in this disclosure, video decoder 300 may calculate the prediction block for the current block using template matching techniques such as when the current block is inter-predicted in CIIP mode or GPM.

Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

FIG. 11 is a flowchart illustrating an example of encoding video data. The example of FIG. 11 is described with respect to processing circuitry, an example of which includes video encoder 200.

The processing circuitry may be configured to determine that a current block is to be inter-predicted in a combined inter-intra prediction (CIIP) mode or a geometric partition mode (GPM) (1100). For instance, mode selection unit 202 may determine cost functions for different prediction modes, and determine that the cost function associated with CIIP mode or GPM for the current block is the lowest. The processing circuitry may also determine that template matching is to be enabled for the current block (1102). For instance, mode selection unit 202 may determine cost functions for encoding the current block with template matching enabled and without template matching enabled, and determine that the cost function for inter-predicting the current block in CIIP mode or GPM with template matching enabled is the lowest.

The processing circuitry may generate a motion vector for the current block based on template matching (1104). For instance, the processing circuitry may construct a merge candidate list. The processing circuitry may determine an initial motion vector based on motion vector information in the merge candidate list. The processing circuitry may generate the motion vector by applying template matching based on the initial motion vector to generate the motion vector. The processing circuitry may also signal information indicative of an index to the merge candidate list that identifies the motion vector information.

In one or more examples, the processing circuitry may be configured to determine a prediction block for the current block based on the motion vector in accordance with CIIP mode or GPM (1106). For instance, for CIIP mode, the processing circuitry may generate the prediction block based on an intra predictor and an inter predictor (e.g., combine the intra predictor and the inter predictor). For GPM, the processing circuitry may generate a first prediction partition for a first partition of the current block based on a first motion vector that is generated based on template matching, and generate a second prediction partition for a second partition of the current block based on a second motion vector that is generated based on template matching. The processing circuitry may combine the first prediction partition and the second prediction partition to determine the prediction block.

The processing circuitry may signal information indicative of a residual between the prediction block and the current block (1108). For instance, the processing circuitry may determine residual values (e.g., difference) on a sample-by-sample basis of the samples in the prediction block and the current block. The processing circuitry may transform and quantize the residual values, and signal the resulting information.

Figure 12:
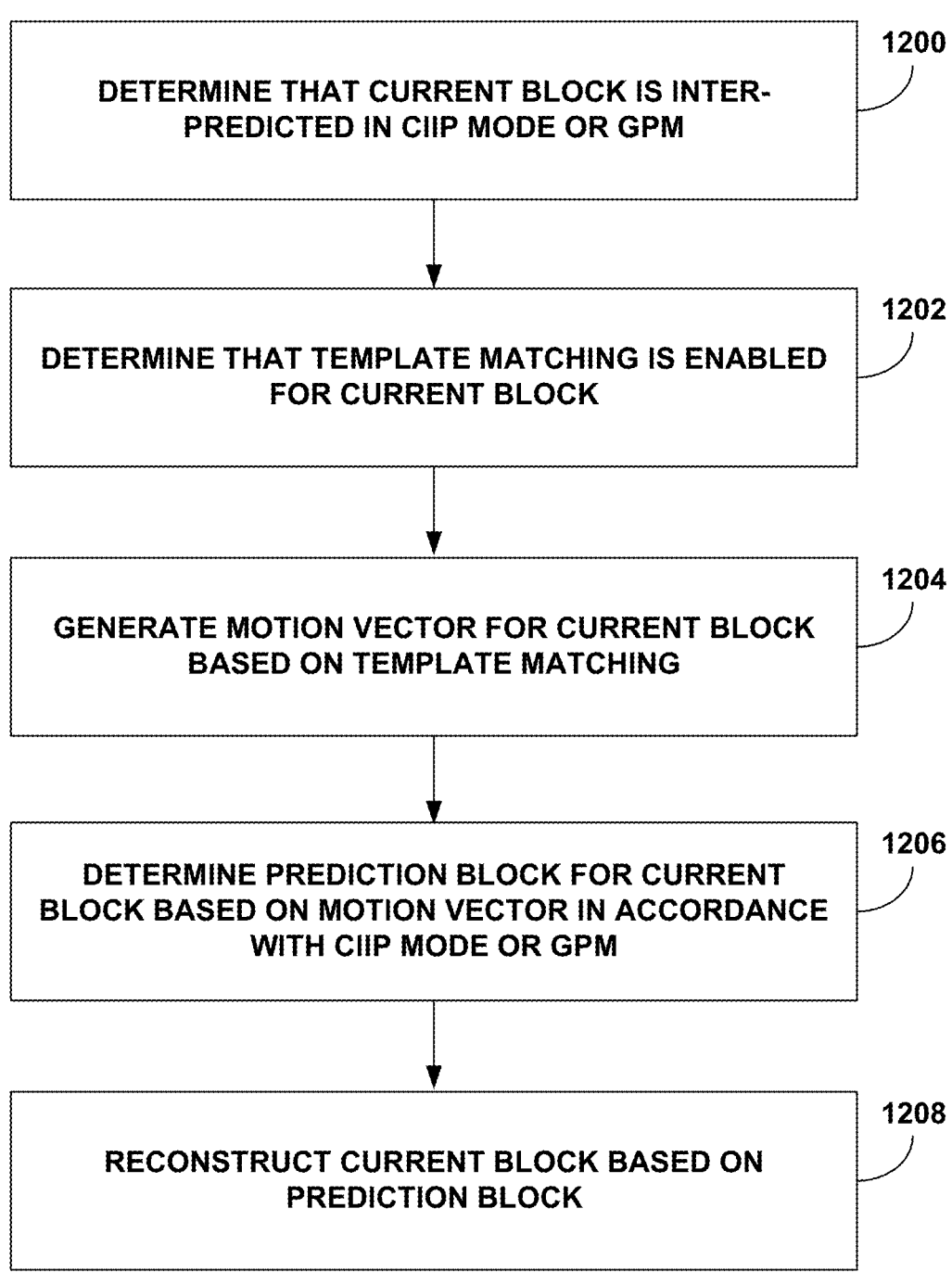
FIG. 12 is a flowchart illustrating an example of decoding video data.

FIG. 12 is a flowchart illustrating an example of decoding video data. The example of FIG. 12 is described with respect to processing circuitry, an example of which includes video decoder 300.

The processing circuitry may be configured to determine that a current block is inter-predicted in a combined inter-intra prediction (CIIP) mode or a geometric partition mode (GPM) (1200). For instance, the processing circuitry may receive a syntax element that indicates that the current block is inter-predicted in CIIP mode or GPM. The processing circuitry may also determine that template matching is enabled for the current block (1202). For instance, the processing circuitry may receive a coding unit (CU) level syntax element indicating that template matching is enabled for the current block.

The processing circuitry may generate a motion vector for the current block based on template matching (1204). For instance, the processing circuitry may construct a merge candidate list. The processing circuitry may receive information indicative of an index into the merge candidate list, and determine an initial motion vector based on the index into the merge candidate list. To generate the motion vector, the processing circuitry may apply template matching based on the initial motion vector to generate the motion vector.

In one or more examples, the processing circuitry may be configured to determine a prediction block for the current block based on the motion vector in accordance with CIIP mode or GPM (1206). For instance, for CIIP mode, the processing circuitry may generate the prediction block based on an intra predictor and an inter predictor (e.g., combine the intra predictor and the inter predictor). The inter predictor may have been generated using template matching. For GPM, the processing circuitry may generate a first prediction partition for a first partition of the current block based on a first motion vector that is generated based on template matching, and generate a second prediction partition for a second partition of the current block based on a second motion vector that is generated based on template matching. The processing circuitry may combine the first prediction partition and the second prediction partition to determine the prediction block.

The processing circuitry may reconstruct the current block based on the prediction block (1208). For example, the processing circuitry may receive information indicative of a residual between the current block and the prediction block, and sum the residual and the prediction block to reconstruct the current block.

The following describes example techniques that may be used separately or in any combination. The techniques of the disclosure should not be considered limited to the below clauses.

Clause 1. A method of coding video data, the method comprising coding one or more syntax elements indicating that template matching refinement is enabled for a block inter-predicted in at least one of combined inter/intra prediction (CIIP), geometric partitioning mode (GPM), or multi-hypothesis prediction (MHP) inter-prediction modes, and coding the block utilizing template matching refinement.

Clause 2. The method of clause 1, wherein coding the one or more syntax elements comprises parsing and decoding the one or more syntax elements, and wherein coding the block comprises decoding the block.

Clause 3. The method of clause 1, wherein coding the one or more syntax elements comprises encoding and signaling the one or more syntax elements, and wherein coding the block comprises encoding the block.

Clause 4. The method of any of clauses 1-3, wherein the one or more syntax elements comprise a flag indicating that template matching refinement is enabled.

Clause 5. The method of any of clauses 1-3, wherein the one or more syntax elements comprises one or a combination of: a first set of flags indicating that template matching refinement is enabled for inter modes, a second set of flags indicating that template matching refinement is enabled for a picture or a slice that includes the block, and at least a third flag indicating that template matching refinement is enabled for the block.

Clause 6. The method of any of clauses 1-5, wherein coding the one or more syntax elements comprises context-based coding the one or more syntax elements.

Clause 7. The method of any of clauses 1-5, wherein the block comprises a first block, the one or more syntax elements comprises a first set of one or more syntax elements, the method further comprising coding a second set of one or more syntax elements indicating that template matching refinement is enabled for a second block inter-predicted in at least one of the CIIP, GPM, or HMP inter-prediction modes, wherein the first block is inter-predicted in at least one of the CIIP, GPM, or HMP inter-prediction modes, and the second block is inter-predicted in at least another one of the CIIP, GPM, or HMP inter-prediction modes, wherein coding the one or more syntax elements comprises context-based coding the first set of one or more syntax elements, wherein coding the second set of one or more syntax elements comprises context-based coding the second set of one or more syntax elements, and wherein a context for coding at least one of the first set of one or more syntax elements is the same as a context for coding at least one of the second set of one or more syntax elements.

Clause 8. The method of any of clauses 1-5, wherein the block comprises a first block, the one or more syntax elements comprises a first set of one or more syntax elements, the method further comprising coding a second set of one or more syntax elements indicating that template matching refinement is enabled for a second block inter-predicted in at least one of the CIIP, GPM, or HMP inter-prediction modes, wherein the first block is inter-predicted in at least one of the CIIP, GPM, or HMP inter-prediction modes, and the second block is inter-predicted in at least another one of the CIIP, GPM, or HMP inter-prediction modes, wherein coding the one or more syntax elements comprises context-based coding the first set of one or more syntax elements, wherein coding the second set of one or more syntax elements comprises context-based coding the second set of one or more syntax elements, and wherein a context for coding at least one of the first set of one or more syntax elements is different than a context for coding at least one of the second set of one or more syntax elements.

Clause 9. The method of any of clauses 1-8, wherein the block comprises a first block, the method further comprising context-based coding one or more parameters associated with an inter-prediction mode in which the first block is inter-predicted, coding a second block in at least one of CIIP, GPM, or MHP inter-prediction modes, with template matching refinement disabled, wherein the inter-prediction mode for the first block and the second block is the same, and context-based coding one or more parameters associated with the inter-prediction mode in which the second is inter-predicted, wherein a context associated with context-based coding the one or more parameters for the first block is different than as a context associated with context-based coding the one or more parameters for the second block.

Clause 10. The method of any of clauses 1-8, wherein the block comprises a first block, the method further comprising context-based coding one or more parameters associated with an inter-prediction mode in which the first block is inter-predicted, coding a second block in at least one of CIIP, GPM, or MHP inter-prediction modes, with template matching refinement disabled, wherein the inter-prediction mode for the first block and the second block is the same, and context-based coding one or more parameters associated with the inter-prediction mode in which the second is inter-predicted, wherein a context associated with context-based coding the one or more parameters for the first block is the same than as a context associated with context-based coding the one or more parameters for the second block.

Clause 11. The method of any of clauses 1-8, wherein the block comprises a first block, the method further comprising context-based coding one or more parameters associated with an inter-prediction mode in which the first block is inter-predicted, coding a second block in at least one of CIIP, GPM, or MHP inter-prediction modes, with template matching refinement disabled, wherein the inter-prediction mode for the first block and the second block is the same, and context-based coding one or more parameters associated with the inter-prediction mode in which the second is inter-predicted, wherein a context associated with context-based coding a first set of bins for the one or more parameters for the first block is the same as a context associated with context-based coding a first set of bines for the one or more parameters for the second block, and wherein a context associated with context-based coding at least one bin in a second set of bins for the one or more parameters for the first block is different than a context associated with context-based coding at least one bin in a second set of bins for the one or more parameters for the second block.

Clause 12. A device for coding video data, the device comprising a memory configured to store the video data, and one or more processors configured to perform the method of any one or combination of clauses 1-11.

Clause 13. The device of clause 12, further comprising a display configured to display decoded video data.

Clause 14. The device of any of clauses 12 and 13, wherein the device comprises one or more of a camera, a computer, a mobile device, a broadcast receiver device, or a set-top box.

Clause 15. The device of any of clauses 12-14, wherein the device comprises a video decoder.

Clause 16. The device of any of clauses 12-14, wherein the device comprises a video encoder.

Clause 17. A computer-readable storage medium having stored thereon instructions that, when executed, cause one or more processors to perform the method of any of clauses 1-11.

Clause 18. A device for coding video data, the device comprising means for performing the method of any of clauses 1-11.

Clause 19. A method of decoding video data, the method comprising: determining that a current block is inter-predicted in a combined inter-intra prediction (CIIP) mode or a geometric partitioning mode (GPM); determining that template matching is enabled for the current block; generating a motion vector for the current block based on template matching; determining a prediction block for the current block based on the motion vector in accordance with the CIIP mode or the GPM; and reconstructing the current block based on the prediction block.

Clause 20. The method of clause 19, further comprising: constructing a merge candidate list; receiving information indicative of an index into the merge candidate list; and determining an initial motion vector based on the index into the merge candidate list, wherein generating the motion vector comprises applying template matching based on the initial motion vector to generate the motion vector.

Clause 21. The method of clause 20, wherein the current block is a first block, wherein the current block is inter-predicted in the CIIP mode, wherein constructing the merge candidate list comprises constructing a first merge candidate list having a first number of candidates, wherein a second merge candidate list for a second block that is inter-predicted in CIIP mode with template matching disabled includes a second number of candidates, and wherein the first number of candidates is different than the second number of candidates.

Clause 22. The method of clause 21, wherein receiving information indicative of the index comprises: determining contexts for a first M bins of the information, wherein the contexts for the first M bins are the same as contexts for M bins for an index into the second merge candidate list; and context-based decoding the information based on the determined contexts.

Clause 23. The method of clause 19, wherein the current block is inter-predicted in GPM, the method further comprising partitioning the current block into a first partition and a second partition, wherein generating the motion vector comprises generating a first motion vector for the first partition of the current block based on template matching, and wherein determining the prediction block for the current block comprises determining the prediction block for the current block based on the first motion vector.

Clause 24. The method of clause 23, further comprising: generating a second motion vector for the second partition of the current block based on template matching and based on the determination that template matching is enabled for the current block, wherein determining the prediction block comprises determining the prediction block for the current block based on the first motion vector and the second motion vector.

Clause 25. The method of clauses 19-22, wherein the current block is inter-predicted in CIIP mode, wherein generating the motion vector for the current block based on template matching comprises: determining an initial motion vector for the current block based on motion information in a merge candidate list; determining a search area in a reference picture based on the initial motion vector; determining reference templates within the search area that substantially match current templates within a current picture that includes the current block; and determining the motion vector for the current block based on the determined reference templates, wherein determining the prediction block comprises: determining an inter-predictor based on the generated motion vector; determining an intra-predictor based on samples neighboring the current block; and combining the inter-predictor and the intra-predictor to determine the prediction block.

Clause 26. The method of clauses 19, 23, and 24, wherein the current block is inter-predicted in GPM, the method further comprising partitioning the current block into a first partition and a second partition, wherein generating the motion vector for the current block based on template matching comprises: determining a first initial motion vector for the first partition based on first motion information in a merge candidate list; determining a first search area in a first reference picture based on the first initial motion vector; determining first reference templates within the first search area that substantially match first current templates of the first partition; and determining a first motion vector for the first partition based on the determined first reference templates, the method further comprising: determining a second initial motion vector for the second partition based on second motion information in the merge candidate list; determining a second search area in a second reference picture based on the second initial motion vector; determining second reference templates within the second search area that substantially match second current templates of the second partition; and determining a second motion vector for the second partition based on the determined second reference templates, wherein determining the prediction block comprises: determining a first prediction partition based on the first motion vector; determining a second prediction partition based on the second motion vector; and combining the first prediction partition and the second prediction partition to determine the prediction block.

Clause 27. The method of any of clauses 19-26, wherein determining that template matching is enabled for the current block comprises receiving a coding unit (CU) level syntax element indicating that template matching is enabled for the current block.

Clause 28. The method of any of clauses 19-27, wherein reconstructing the current block based on the prediction block comprises: receiving information indicative of a residual between the current block and the prediction block; and summing the residual and the prediction block to reconstruct the current block.

Clause 29. A device for decoding video data, the device comprising: memory configured to store the video data; and processing circuitry configured to: determine that a current block of the video data is inter-predicted in a combined inter-intra prediction (CIIP) mode or a geometric partitioning mode (GPM); determine that template matching is enabled for the current block; generate a motion vector for the current block based on template matching; determine a prediction block for the current block based on the motion vector in accordance with the CIIP mode or the GPM; and reconstruct the current block based on the prediction block.

Clause 30. The device of clause 29, wherein the processing circuitry is configured to: construct a merge candidate list; receive information indicative of an index into the merge candidate list; and determine an initial motion vector based on the index into the merge candidate list, wherein to generate the motion vector, the processing circuitry is configured to apply template matching based on the initial motion vector to generate the motion vector.

Clause 31. The device of clause 30, wherein the current block is a first block, wherein the current block is inter-predicted in the CIIP mode, wherein to construct the merge candidate list, the processing circuitry is configured to construct a first merge candidate list having a first number of candidates, wherein a second merge candidate list for a second block that is inter-predicted in CIIP mode with template matching disabled includes a second number of candidates, and wherein the first number of candidates is different than the second number of candidates.

Clause 32. The device of clause 31, wherein to receive information indicative of the index, the processing circuitry is configured to: determine contexts for a first M bins of the information, wherein the contexts for the first M bins are the same as contexts for M bins for an index into the second merge candidate list; and context-based decode the information based on the determined contexts.

Clause 33. The device of clause 29, wherein the current block is inter-predicted in GPM, wherein the processing circuitry is configured to partition the current block into a first partition and a second partition, wherein to generate the motion vector, the processing circuitry is configured to generate a first motion vector for the first partition of the current block based on template matching, and wherein to determine the prediction block for the current block, the processing circuitry is configured to determine the prediction block for the current block based on the first motion vector.

Clause 34. The device of clause 33, wherein the processing circuitry is configured to: generate a second motion vector for the second partition of the current block based on template matching and based on the determination that template matching is enabled for the current block, wherein to determine the prediction block, the processing circuitry is configured to determine the prediction block for the current block based on the first motion vector and the second motion vector.

Clause 35. The device of any of clauses 29-32, wherein the current block is inter-predicted in CIIP mode, wherein to generate the motion vector for the current block based on template matching, the processing circuitry is configured to: determine an initial motion vector for the current block based on motion information in a merge candidate list; determine a search area in a reference picture based on the initial motion vector; determine reference templates within the search area that substantially match current templates within a current picture that includes the current block; and determine the motion vector for the current block based on the determined reference templates, and wherein to determine the prediction block, the processing circuitry is configured to: determine an inter-predictor based on the generated motion vector; determine an intra-predictor based on samples neighboring the current block; and combine the inter-predictor and the intra-predictor to determine the prediction block.

Clause 36. The device of any of clauses 29, 33, and 34, wherein the current block is inter-predicted in GPM, wherein the processing circuitry is configured to partition the current block into a first partition and a second partition, wherein to generate the motion vector for the current block based on template matching, the processing circuitry is configured to: determine a first initial motion vector for the first partition based on first motion information in a merge candidate list; determine a first search area in a first reference picture based on the first initial motion vector; determine first reference templates within the first search area that substantially match first current templates of the first partition; and determine a first motion vector for the first partition based on the determined first reference templates, wherein the processing circuitry is configured to: determine a second initial motion vector for the second partition based on second motion information in the merge candidate list; determine a second search area in a second reference picture based on the second initial motion vector; determine second reference templates within the second search area that substantially match second current templates of the second partition; and determine a second motion vector for the second partition based on the determined second reference templates, and wherein to determine the prediction block, the processing circuitry is configured to: determine a first prediction partition based on the first motion vector; determine a second prediction partition based on the second motion vector; and combine the first prediction partition and the second prediction partition to determine the prediction block.

Clause 37. The device of any of clauses 29-36, wherein to determine that template matching is enabled for the current block, the processing circuitry is configured to receive a coding unit (CU) level syntax element indicating that template matching is enabled for the current block.

Clause 38. The device of any of clauses 29-37, wherein to reconstruct the current block based on the prediction block, the processing circuitry is configured to: receive information indicative of a residual between the current block and the prediction block; and sum the residual and the prediction block to reconstruct the current block.

Clause 39. The device of any of clauses 29-38, further comprising a display configured to display decoded video data.

Clause 40. The device of any of clause 29-39, wherein the device comprises one or more of a camera, a computer, a mobile device, a broadcast receiver device, or a set-top box.

Clause 41. A computer-readable storage storing instructions thereon that when executed cause one or more processors to: determine that a current block is inter-predicted in a combined inter-intra prediction (CIIP) mode or a geometric partitioning mode (GPM); determine that template matching is enabled for the current block; generate a motion vector for the current block based on template matching; determine a prediction block for the current block based on the motion vector in accordance with the CIIP mode or the GPM; and reconstruct the current block based on the prediction block.

Clause 42. The computer-readable storage medium of clause 41, further comprising instructions that cause the one or more processors to: construct a merge candidate list; receive information indicative of an index into the merge candidate list; and determine an initial motion vector based on the index into the merge candidate list, wherein the instructions that cause the one or more processors to generate the motion vector comprise instructions that cause the one or more processors to apply template matching based on the initial motion vector to generate the motion vector.

Clause 43. A method of encoding video data, the method comprising: determining that a current block is to be inter-predicted in a combined inter-intra prediction (CIIP) mode or a geometric partitioning mode (GPM); determining that template matching is to be enabled for the current block; generating a motion vector for the current block based on template matching; determining a prediction block for the current block based on the motion vector in accordance with CIIP mode or GPM; and signaling information indicative of a residual between the prediction block and the current block.

Clause 44. The method of clause 43, further comprising: constructing a merge candidate list; determining an initial motion vector based on motion vector information in the merge candidate list, wherein generating the motion vector comprises applying template matching based on the initial motion vector to generate the motion vector, the method further comprising signaling information indicative of an index to the merge candidate list that identifies the motion vector information.

Clause 45. A device for encoding video data, the device comprising: memory configured to store the video data; and processing circuitry configured to: determine that a current block is to be inter-predicted in a combined inter-intra prediction (CIIP) mode or a geometric partitioning mode (GPM); determine that template matching is to be enabled for the current block; generate a motion vector for the current block based on template matching; determine a prediction block for the current block based on the motion vector in accordance with CIIP mode or GPM; and signal information indicative of a residual between the prediction block and the current block.

Clause 46. The device of clause 45, wherein the processing circuitry is configured to: construct a merge candidate list; determine an initial motion vector based on motion vector information in the merge candidate list, wherein to generate the motion vector, the processing circuitry is configured to apply template matching based on the initial motion vector to generate the motion vector, and wherein the processing circuitry is configured to signal information indicative of an index to the merge candidate list that identifies the motion vector information.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining that a current block is inter-predicted in a combined inter-intra prediction mode;
   determining that motion vector refinement mode is enabled for the current block;
   constructing a merge candidate list;
   receiving information indicative of an index into the merge candidate list;
   determining an initial motion vector for the current block based on the index into the merge candidate list;
   generating a motion vector for the current block that is inter-predicted in the combined inter-intra prediction mode according to the motion vector refinement mode, wherein generating the motion vector comprises applying motion vector refinement based on the initial motion vector;
   determining a prediction block for the current block based on the motion vector in accordance with the combined inter-intra prediction mode; and
   reconstructing the current block based on the prediction block.

2. The method of claim 1,
   wherein the current block is a first block,
   wherein constructing the merge candidate list comprises constructing a first merge candidate list having a first number of candidates,
   wherein a second merge candidate list for a second block that is inter-predicted in inter-intra prediction mode with motion vector refinement mode disabled includes a second number of candidates, and
   wherein the first number of candidates is different than the second number of candidates.

3. The method of claim 2, wherein receiving information indicative of the index comprises:
   determining contexts for a first M bins of the information, wherein the contexts for the first M bins are the same as contexts for M bins for an index into the second merge candidate list; and
   context-based decoding the information based on the determined contexts.

4. The method of claim 1,
   wherein generating the motion vector for the current block comprises:
   determining a search area in a reference picture based on the initial motion vector;
   determining reference templates within the search area that substantially match current templates within a current picture that includes the current block; and
   determining the motion vector for the current block based on the determined reference templates, wherein determining the prediction block comprises:
  determining an inter-predictor based on the generated motion vector;
  determining an intra-predictor based on samples neighboring the current block; and
  combining the inter-predictor and the intra-predictor to determine the prediction block.

5. The method of claim 1, wherein determining that motion vector refinement mode is enabled for the current block comprises receiving a coding unit (CU) level syntax element indicating that motion vector refinement mode is enabled for the current block.

6. The method of claim 1, wherein reconstructing the current block based on the prediction block comprises:
  receiving information indicative of a residual between the current block and the prediction block; and
  summing the residual and the prediction block to reconstruct the current block.

7. A device for decoding video data, the device comprising:
  memory configured to store the video data; and
  processing circuitry configured to:
    determine that a current block of the video data is inter-predicted in a combined inter-intra prediction mode;
    determine that motion vector refinement mode is enabled for the current block;
    construct a merge candidate list;
    receive information indicative of an index into the merge candidate list;
    determine an initial motion vector for the current block based on the index into the merge candidate list;
    generate a motion vector for the current block that is inter-predicted in the combined inter-intra prediction mode according to the motion vector refinement mode, wherein to generate the motion vector, the processing circuitry is configured to apply motion vector refinement based on the initial motion vector;
    determine a prediction block for the current block based on the motion vector in accordance with the combined inter-intra prediction mode; and
    reconstruct the current block based on the prediction block.

8. The device of claim 7,
wherein the current block is a first block,
wherein to construct the merge candidate list, the processing circuitry is configured to construct a first merge candidate list having a first number of candidates,
wherein a second merge candidate list for a second block that is inter-predicted in inter-intra prediction mode with motion vector refinement mode disabled includes a second number of candidates, and
wherein the first number of candidates is different than the second number of candidates.

9. The device of claim 8, wherein to receive information indicative of the index, the processing circuitry is configured to:

determine contexts for a first M bins of the information, wherein the contexts for the first M bins are the same as contexts for M bins for an index into the second merge candidate list; and context-based decode the information based on the determined contexts.

10. The device of claim 7,
wherein to generate the motion vector for the current block, the processing circuitry is configured to:
  determine a search area in a reference picture based on the initial motion vector;
  determine reference templates within the search area that substantially match current templates within a current picture that includes the current block; and
determine the motion vector for the current block based on the determined reference templates, and
wherein to determine the prediction block, the processing circuitry is configured to:
  determine an inter-predictor based on the generated motion vector;
  determine an intra-predictor based on samples neighboring the current block; and
  combine the inter-predictor and the intra-predictor to determine the prediction block.

11. The device of claim 7, wherein to determine that motion vector refinement mode is enabled for the current block, the processing circuitry is configured to receive a coding unit (CU) level syntax element indicating that motion vector refinement mode is enabled for the current block.

12. A computer-readable storage storing instructions thereon that when executed cause one or more processors to:
  determine that a current block is inter-predicted in a combined inter-intra prediction mode;
  determine that motion vector refinement mode is enabled for the current block;
  determine that motion vector refinement mode is enabled for the current block;
  construct a merge candidate list;
  receive information indicative of an index into the merge candidate list;
  determine an initial motion vector for the current block based on the index into the merge candidate list;
  generate a motion vector for the current block that is inter-predicted in the combined inter-intra prediction mode according to the motion vector refinement mode, wherein the instructions that cause the one or more processors to generate the motion vector comprise instructions that cause the one or more processors to apply motion vector refinement based on the initial motion vector;
  determine a prediction block for the current block based on the motion vector in accordance with the combined inter-intra prediction mode; and
  reconstruct the current block based on the prediction block.

* * * * *